(12) United States Patent
Way et al.

(10) Patent No.: US 8,139,476 B2
(45) Date of Patent: Mar. 20, 2012

(54) OPTICAL RING NETWORKS USING CIRCULATING OPTICAL PROBE IN PROTECTION SWITCHING WITH AUTOMATIC REVERSION

(75) Inventors: Winston I. Way, Irvine, CA (US); Cedric Lam, Irvine, CA (US)

(73) Assignee: Vello Systems, Inc., Menlo Park, CA (US)

( * ) Notice: Subject to any disclaimer, the term of this patent is extended or adjusted under 35 U.S.C. 154(b) by 720 days.

(21) Appl. No.: 11/580,537

(22) Filed: Oct. 13, 2006

(65) Prior Publication Data
US 2007/0086332 A1  Apr. 19, 2007

Related U.S. Application Data

(60) Provisional application No. 60/726,991, filed on Oct. 13, 2005.

(51) Int. Cl.
*G01R 31/08* (2006.01)
*G06F 11/00* (2006.01)
*G01F 11/00* (2006.01)

(52) U.S. Cl. ........ 370/217; 370/221; 370/222; 370/248; 370/225; 370/242

(58) Field of Classification Search .................. 370/222, 370/221, 248, 225, 242
See application file for complete search history.

(56) References Cited

U.S. PATENT DOCUMENTS

| | | | |
|---|---|---|---|
| 5,062,684 A | 11/1991 | Clayton et al. | |
| 5,101,450 A | 3/1992 | Olshansky | |
| 5,239,401 A | 8/1993 | Olshansky | |
| 5,301,058 A | 4/1994 | Olshansky | |
| 5,333,000 A | 7/1994 | Hietala et al. | |
| 5,390,188 A | 2/1995 | Dawson et al. | |
| 5,442,623 A | 8/1995 | Wu | |
| 5,479,082 A | 12/1995 | Calvani et al. | |
| 5,509,093 A | 4/1996 | Miller et al. | |
| 5,539,559 A | 7/1996 | Cisneros et al. | |
| 5,546,210 A | 8/1996 | Chraplyvy et al. | |
| 5,596,436 A | 1/1997 | Sargis et al. | |
| 5,600,466 A | 2/1997 | Tsushima et al. | |
| 5,608,825 A | 3/1997 | Ip | |
| 5,617,233 A | 4/1997 | Boncek | |

(Continued)

FOREIGN PATENT DOCUMENTS
DE  19828614  12/1999
(Continued)

OTHER PUBLICATIONS

Gerstel, O. and R. Ramaswami, "Optical layer survivability: a service perspective," IEEE Communications Magazine, pp. 104-113, Mar. 2000.

(Continued)

*Primary Examiner* — Huy Vu
*Assistant Examiner* — Omer Mian
(74) *Attorney, Agent, or Firm* — Michael K. Bosworth; IPxLaw Group LLP

(57) ABSTRACT

Techniques and apparatus for optical communication networks including fiber ring networks with protection switching to maintain optical communications when an optical failure occurs and to automatically revert to normal operation when the optical failure is corrected. Implementations include use of a circulating optical probe signal at an optical probe wavelength within the gain spectral range of optical amplifiers used in a fiber ring network to detect an optical failure.

16 Claims, 19 Drawing Sheets

U.S. PATENT DOCUMENTS

| | | | |
|---|---|---|---|
| 5,625,478 A | 4/1997 | Doerr et al. | |
| 5,663,820 A | 9/1997 | Shiragaki | |
| 5,680,235 A | 10/1997 | Johansson et al. | |
| 5,696,614 A | 12/1997 | Ishikawa et al. | |
| 5,712,716 A | 1/1998 | Vanoli et al. | |
| 5,717,795 A | 2/1998 | Sharma et al. | |
| 5,734,493 A | 3/1998 | Jopson | |
| 5,742,416 A | 4/1998 | Mizrahi | |
| 5,745,273 A | 4/1998 | Jopson | |
| 5,764,821 A | 6/1998 | Glance | |
| 5,778,118 A | 7/1998 | Sridhar | |
| 5,781,327 A | 7/1998 | Brock et al. | |
| 5,784,184 A | 7/1998 | Alexander et al. | |
| 5,786,913 A | 7/1998 | Pfeiffer | |
| 5,796,501 A | 8/1998 | Sotom et al. | |
| 5,822,095 A | 10/1998 | Taga et al. | |
| 5,838,475 A | 11/1998 | Takeyari et al. | |
| 5,870,212 A | 2/1999 | Nathan et al. | |
| 5,880,870 A | 3/1999 | Sieben et al. | |
| 5,896,212 A | 4/1999 | Sotom et al. | |
| 5,917,638 A | 6/1999 | Franck et al. | |
| 5,923,449 A | 7/1999 | Doerr et al. | |
| 5,938,309 A | 8/1999 | Taylor | |
| 5,940,197 A | 8/1999 | Ryu | |
| 5,949,273 A | 9/1999 | Mourick et al. | |
| 5,949,560 A | 9/1999 | Roberts et al. | |
| 5,953,141 A | 9/1999 | Liu et al. | |
| 5,982,518 A | 11/1999 | Mizarahi | |
| 5,982,963 A | 11/1999 | Feng et al. | |
| 6,008,931 A | 12/1999 | Von Helmolt et al. | |
| 6,023,359 A | 2/2000 | Asahi | |
| 6,035,080 A | 3/2000 | Henry et al. | |
| 6,069,732 A | 5/2000 | Koch et al. | |
| 6,084,694 A | 7/2000 | Miltom et al. | |
| 6,088,141 A | 7/2000 | Merli et al. | |
| 6,089,694 A | 7/2000 | Murakami | |
| 6,118,566 A | 9/2000 | Price et al. | |
| 6,130,766 A | 10/2000 | Cao | |
| 6,163,553 A | 12/2000 | Pfeiffer | |
| 6,191,854 B1 | 2/2001 | Grasso et al. | |
| 6,192,173 B1 | 2/2001 | Solheim et al. | |
| 6,195,186 B1 | 2/2001 | Asahi | |
| 6,195,351 B1 | 2/2001 | Hiscock et al. | |
| 6,201,909 B1 | 3/2001 | Kewitsch et al. | |
| 6,208,441 B1 | 3/2001 | Jones et al. | |
| 6,211,980 B1 | 4/2001 | Terahara | |
| 6,222,654 B1 | 4/2001 | Frigo | |
| 6,259,836 B1 | 7/2001 | Dodds | |
| 6,271,946 B1 | 8/2001 | Chang et al. | |
| 6,285,479 B1 | 9/2001 | Okazaki et al. | |
| 6,339,663 B1 | 1/2002 | Leng et al. | |
| 6,351,323 B1 | 2/2002 | Onaka et al. | |
| 6,369,923 B1 | 4/2002 | Kuo et al. | |
| 6,385,204 B1 | 5/2002 | Hoefelmeyer et al. | |
| 6,404,535 B1 | 6/2002 | Leight | |
| 6,414,765 B1 | 7/2002 | Li et al. | |
| 6,433,904 B1 | 8/2002 | Swanson et al. | |
| 6,466,342 B1 | 10/2002 | Frigo et al. | |
| 6,525,852 B1 | 2/2003 | Egnell | |
| 6,525,857 B1 | 2/2003 | Way et al. | |
| 6,556,744 B1 | 4/2003 | Brimacombe et al. | |
| 6,560,252 B1 | 5/2003 | Colbourne et al. | |
| 6,580,537 B1 | 6/2003 | Chang et al. | |
| 6,590,681 B1 | 7/2003 | Egnell et al. | |
| 6,608,854 B1* | 8/2003 | Watanabe | 372/96 |
| 6,657,952 B1 | 12/2003 | Shiragaki et al. | |
| 6,661,976 B1 | 12/2003 | Gnauck et al. | |
| 6,701,085 B1 | 3/2004 | Muller | |
| 6,788,899 B2 | 9/2004 | Way | |
| 6,891,981 B2 | 5/2005 | Price et al. | |
| 6,895,184 B2 | 5/2005 | Way | |
| 6,970,655 B2 | 11/2005 | Ono et al. | |
| 7,003,231 B2 | 2/2006 | Way et al. | |
| 7,024,112 B2 | 4/2006 | Way | |
| 7,068,949 B2 | 6/2006 | Jung et al. | |
| 7,120,359 B2 | 10/2006 | Way | |
| 7,206,520 B2 | 4/2007 | Way et al. | |
| 2002/0012148 A1 | 1/2002 | Oksanen | |
| 2002/0015553 A1 | 2/2002 | Claringburn et al. | |
| 2002/0023170 A1 | 2/2002 | Seaman et al. | |
| 2002/0030877 A1 | 3/2002 | Way et al. | |
| 2002/0063928 A1 | 5/2002 | Hansen et al. | |
| 2002/0067523 A1* | 6/2002 | Way | 359/119 |
| 2002/0080440 A1 | 6/2002 | Li et al. | |
| 2002/0114034 A1 | 8/2002 | Way | |
| 2002/0126350 A1 | 9/2002 | Sato et al. | |
| 2002/0135838 A1 | 9/2002 | Way | |
| 2003/0165119 A1* | 9/2003 | Hsu et al. | 370/258 |
| 2003/0169470 A1 | 9/2003 | Alagar et al. | |
| 2003/0180047 A1 | 9/2003 | Way et al. | |
| 2003/0185248 A1* | 10/2003 | Klipper et al. | 370/535 |
| 2004/0208561 A1* | 10/2004 | Kinoshita et al. | 398/59 |
| 2005/0018600 A1 | 1/2005 | Tornar | |
| 2005/0025490 A1 | 2/2005 | Aoki et al. | |
| 2005/0078965 A1 | 4/2005 | Kim et al. | |
| 2005/0158047 A1* | 7/2005 | Way et al. | 398/59 |
| 2005/0185969 A1 | 8/2005 | Moeller et al. | |
| 2005/0201762 A1 | 9/2005 | Moeller et al. | |
| 2005/0213968 A1* | 9/2005 | Uda et al. | 398/30 |
| 2005/0286908 A1 | 12/2005 | Way | |
| 2006/0051092 A1 | 3/2006 | Way | |
| 2006/0140643 A1 | 6/2006 | Way et al. | |
| 2006/0269295 A1 | 11/2006 | Way | |
| 2006/0275035 A1 | 12/2006 | Way | |

FOREIGN PATENT DOCUMENTS

| | | |
|---|---|---|
| WO | WO96/32787 | 10/1996 |
| WO | WO01/67647 | 9/2001 |
| WO | WO01/67648 | 9/2001 |
| WO | WO02/23772 | 3/2002 |
| WO | WO02/058301 | 7/2002 |
| WO | WO04/002024 | 12/2003 |
| WO | WO2004/064259 | 7/2004 |
| WO | WO2006/002080 | 1/2006 |
| WO | WO2006/119375 | 11/2006 |
| WO | WO 2007/044939 | 4/2007 |

OTHER PUBLICATIONS

Johansson, B.S. et al., "Flexible bus: a self-restoring optical ADM ring architecture," Electronic Letters, vol. 32, No. 25, pp. 2338-2339, Dec. 1996.

Adamczyk, et al. "All-Optical Output-Port Contention Resolution Using Subcarrier-Multiplexing", Optical Fiber Communications Conference 2000, Mar. 7-10, 2000, pp. 332-334.

Bannister, et al. "How Many Wavelengths Do We Really Need?, A Study of the Performance Limits of Packet Over Wavelengths", SPIE Optical Network Magazine, Apr. 2000, pp. 1-12.

Blumenthal, et al. "All-Optical Label Swapping with Wavelength Conversion for WDM-IP Networks with Subcarrier Multiplexed Addressing", IEEE Photonics Technology Letters, vol. 11, No. 11, Nov. 1999, pp. 1497-1499.

Bosco, G. et al., "Modulation formats suitable for ultrahigh spectral efficient WDM systems," IEEE J. Selected Topics in Quantum Electron. 10(22): 321-328 (Mar./Apr. 2004).

Bosco, G. et al., "On the use of NRZ, RZ, and CSRZ modulation at 40 Gb/s with narrow DWDM channel spacing," Journal of Lightwave Technology, p. 1694-1704, Sep. 2002.

Ramamurthy, Byrav, et al. "Wavelength Conversion in WDM Networking", IEEE Journal on Selected Areas in Communication, vol. 16, Sep. 1998, pp. 1061-1073.

Chao, et al. "A Photonic Front-End Processor in a WDM AEM Multicast Switch", Journal of Lightwave Technology, vol. 18, No. 3, Mar. 2000, pp. 273-285.

Daikoku, M. et al., "Performance comparison of modulation formats for 40Gb/s DWDM transmission systems," paper OFN2, Optical Fiber Communications (OFC) Conference, 2005, 3 pages.

Derr, et al. "An Optical Infrastructure for Future Telecommunications Networks", IEEE Communications Magazine, vol. 33, No. 11, Nov. 1995 pp. 84-88.

English language Translation of DE 19828614, published Dec. 30, 1999, entitled "Method and device for optical transmission via light waveguides", 10 pages.

Frankel, et al. "Optical Single-Sideband Suppressed-Carrier Modulator for Wide-Band Signal Processing", Journal of Lightwave Technology, vol. 16, No. 5, May 1998, pp. 859-863.

Ghani, "Lambda-Labeling: A Framework for IP-Over-WDM Using MPLS", Optical Networks Magazine, vol. 1, No. 2, Apr. 2000, pp. 45-58.

Gnauck, A.H. and P.J. Winzer, "Optical phase shifted keyed transmission," Journal of Lightwave Technology 23(1): 115-130 (Jan. 2005).

Goldstein et al., "Performance implications of component crosstalk in transparent lightwave netowrks," IEEE Photonics Technolog Letters 6(5): 657-660, (May 1994).

Heismann, "Polarization Mode Dispersion: Fundamentals and Impact on Optical Communication System", European Conference of Optical Communications (ECOC '98), Sep. 20-24, 1998, Madrid, Spain, vol. 2, pp. 51-79 (1998).

Hill, et al. "Multigigabit Subcarrier Multiplexed Coherent Lightwave System", Journal of Lightwave Technology, vol. 10, No. 11, Nov. 1992, pp. 1656-1664.

Hui, R., "Multitributary OFDM optical transmitter using carrier-suppressed optical single-sideband modulation," Optical Fiber Communications Conference, 2003. OFC 2003, Mar. 23-28, 2003 pp. 92-93.

Hui et al., "10 Gb/s SCM system using optical single side-band modulation," Optical Fiber Communication Conference and Exhibit, 2001. OFC 2001, vol. 1, Issue, 2001 pp. MM4-1-MM4-4.

ITU-T Recommendation G.692, "Optical Interfaces for Multichannel Systems with Optical Amplifiers", Oct. 1998, pp. 14-23.

Izutsu, et al., "Integrated Optical SSB Modulation/Frequency Shifter", IEEE Journal of Quantum Electronics, vol. QE-17, No. 11, Nov. 1981, pp. 2225-2227.

Jiang et al., "Multi-Lane PMD Reliability and Partial Fault Protection (PFP)," IEEE 802.3ba, Jan. 2008, 25 pages, http://www.ieee802.org/3/ba/public/jan08/jiang_01_0108.pdf [accessed on Apr. 8, 2008].

Joo, Y. et al., "1-fiber WDM self-healing ring with bidirectional optical add/drop muliplexers," IEEE Photon. Technol. Lett. 16(2):: 683-685 (Feb. 2004).

Kaminow, I. and T. Li, (Eds.), *Optical Fiber Telecommunications IVB: Systems and Impairments*, San Diego: Academic Press, Chapter 16, pp. 868-876 (2002).

Khrais, et al. "Effects of Cascaded Misaligned Optical (de)Multiplexers on Multiwavelength Optical Network Performance", OFC, Paper ThD-4, Feb. 1996.

Kinoshita et al., "Metro WDM network with photonic domains," Optical Fiber Communication Conference OFC 2004, vol. 1, Feb. 23-27, 2004, 3 pages.

Kitayama, "Highly Spetrum Efficient OFDM/PDM Wireless Networks by Using Optical SSB Modulation", Journal of Lightwave Technology, vol. 16, No. 6, Jun. 1998, pp. 969-976.

Lee, et al. "A Wavelength-Convertible Optical Network", Journal of Lightwave Technology, vol. 11, May/Jun. 1993, p. 962.

Lyubomirsky, I. and C. Chien, "Tailoring the duobinary pulse shape for optimum performance," J. Lightwve Technology 23(11): 3732-3736 (Nov. 2005).

Masetti, et al. "High Speed, High Capacity ATM Optical Switches for Future Telecommunication Transport Networks", IEEE Journal on Selected Areas in Communications, vol. 14, No. 5, Jun. 1996, pp. 979-998.

Ohn, et al. "Dispersion Variable Fibre Bragg Grating Using a Piezoelectric Stack", Electronic Letters, vol. 32, No. 21, Oct. 10, 1996, pp. 2000-2001.

Okamoto, et al. "Optical Path Cross-Connect Systems for Photonic Networks", Global Telecommunications Conference, Nov. 1993, vol. 1, pp. 474-480.

Ono, T. et al., "Characteristics of optical duobinary signals in terabit/s capacity, high spectral efficiency WDM systems," J. Lightwave Technology 16(5): 788-797, May 1998.

Ramos, et al. "Comparison of Optical Single-Sideband Modulation and Chirped Fiber Gratings as Dispersion Mitigating Techniques in Optical Millimeter-Wave Multichannel Systems", IEEE Photonics Technology Letters, vol. 11, No. 11, Nov. 1999, pp. 1479-1481.

Sano et al., "30×100 gb/s all-optical OFDM transmission over 1300 km SMF with 10 ROADM nodes", Technical Digest of ECOC 2007, Paper PDS1.7 (2007), 2 pages.

Sargis, P.D. et al., "10-G-b/s subcarrier muliplexed transmission over 490 km of ordinary single-mode fiber without dispersion compensation," IEEE Photon. Technol. Lett. 9(12):: 1658-1660, (Dec. 1997).

Shankar, "Duobinary Modulation for Optical Systems," Dec. 5, 2002 http://www.inphi-corp.com/products/whitepapers/DuobinaryModulationForOpticalSystems.pdf [accessed on Oct. 14, 2005], 10 pages.

Shi et al., "High-speed electrooptic modulator characterization using optical spectrum analysis," J. Lightwave Technol. 21(10): 2358-2367, (Oct. 2003).

Shtaif, M. and A.H. Gnauck, "The relation between optical duobinary modulation and spectral efficiency in WDM systems," IEEE Photon. Technol. Lett. 11(6): 712-714 (Jun. 1999.

Sieben, et al. "Optical Single Sideband Transmission at 10 Gb/s Using Only Electrical Dispersion Compensation", Journal of Lightwave Technology, vol. 17, No. 10, Oct. 1999, pp. 1742-1748.

Smith, et al. "Broad-Band Millimeter-Wave (38 GHz) Fiber-Wireless Transmission System Using Electrical and Optical SSB Modulation to Overcome Dispersion Effects", IEEE Photonics Technology Letters, vol. 10, No. 1, Jan. 1998 pp. 141-144.

Smith et al., "Overcoming Chromatic-Dispersion Effects in Fiber-Wireless Systems Incorporating External Modulators," IEEE Transactions on Microwave Theory and Techniques 45(8): 1410-1415 (Aug. 1997).

Spring, et al. "Photonic Header Replacement for Packet Switching", Electronic Letters, vol. 29, No. 17, Aug. 19, 1993, pp. 1523-1525.

Sun, et al. "Tunable Compensation of Dispersion-Induced RF Power Degradation in Multiple-Channel SCM Transmission by Nonlinearly-Chirped FBG's", CLEO '99, 1999, pp. 316-317.

van den Borne, D. et al., "Coherent equalization versus direct detection for 111-Gb/s Ethernet transport," IEEE LEOS Summer Tropical Meetings, pp. 11-12, Jul. 23-25, 2007.

van Deventer et al., "Power penalties due to Brillouin and Rayleigh scattering in a bi-directional coherent transmission system," IEEE Photon. Lett. 6(2): 291-294 (Feb. 1994).

Walkin, "Multilevel Signaling for Increasing the Reach of 10 Gb/s Lightwave Systems", Journal of Lightwave Technology, vol. 17, No. 11, Nov. 1999 pp. 2235-2248.

Way, "Broadband Hybrid Fiber Coax Access System Technologies", New York Acacemic Press, 1998, pp. 253-300.

Way, "Subcarrier Multiplexed Lightwave System Design Considerations for Subscriber Loop Applications", Journal of Lightwave Technology, vol. 7, No. 11, Nov. 1989, pp. 1806-1818.

Way, W.I.., "Spectrally efficient parallel PHY for 100 GbE MAN and WAN," IEEE Applications and Practice (distributed with IEEE Communications Magazine). pp. 20-23, (Dec. 2007).

Weng, C. and W.I. Way, "A Single-Fiber Optical Unidirectional Path-Switched-Ring Network Using Double-Sideband-Suppressed Carrier Modulation Technique," Photonics Technology Letters, IEEE 18(21): 2236-2238 (Nov. 1, 2006).

Winzer, P. and G. Raybon,"100G Ethernet—a review of serial transport options," IEEE LEOS Summer Tropical Meetings, Jul. 23-25, 2007, pp. 7-8.

Wree, C. et al., "Coherent receivers for phase-shift keyed transmission," OFC/NFOEC, paper OMP6, 2007, 3 pages.

Wu, et al. "CSO Distortions Due to the Combined Effects of Self- and External-Phase Modulations in Long-Distance 1550-nm AM-CATV Systems", IEEE Photonics Technology Letters, vol. 11, No. 6, Jun. 1999, pp. 718-720.

Xie, C. et al., "Improvement of optical NRZ- and RZ-duobinary transmission systems with narrow bandwidth optial filters," IEEE Photon.Tech. Lett. 16(9): 2162-2164 (Sep. 2004).

Yonenaga, et al. "Dispersion-Tolerant Optical Transmission System Using Duobinary Transmitter and Binary Receiver", Journal of Lightwave Technology, vol. 15, No. 8, Aug. 1997, pp. 1530-1537.

Yonenaga et al., "Optical duobinary transmission system with no receiver sensitivity degradation," Electron Lett. vol. 31, No. 4., pp. 302-304 (Feb. 16, 1995).

* cited by examiner

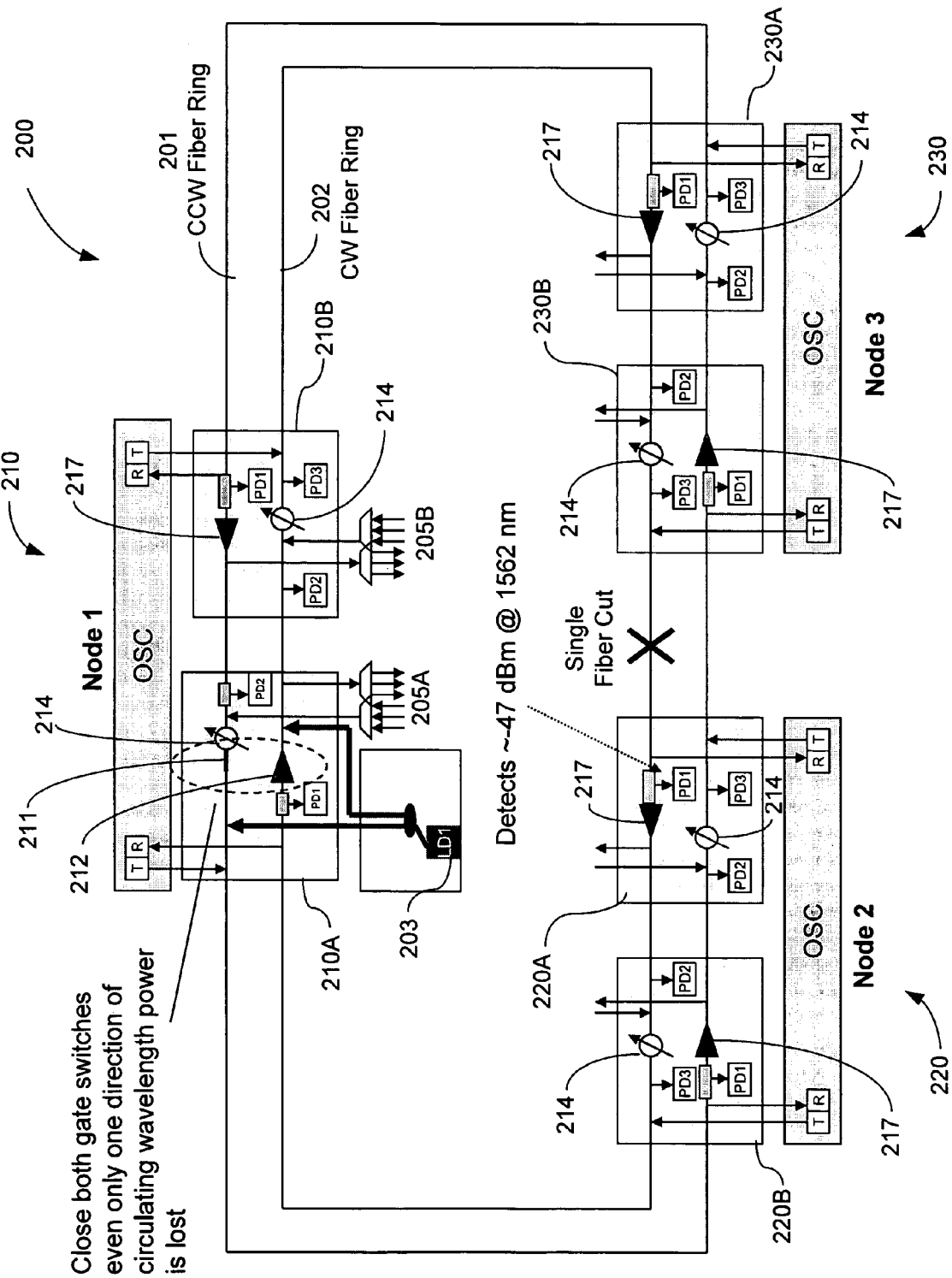

Serial Redundant Switch Pair

Parallel Redundant Switch Pair

Open Mode

Close Mode

OPTICAL RING NETWORKS USING CIRCULATING OPTICAL PROBE IN PROTECTION SWITCHING WITH AUTOMATIC REVERSION

This application claims the benefit of U.S. Provisional Patent Applications Ser. No. 60/726,991 entitled "Dual-Fiber Ring Optical Networks with Re-configurable Optical Add-Drop Technology and Broadcast-and-Select Architecture" filed on Oct. 13, 2005, the entire disclosure of which is incorporated by reference as part of the specification of this application.

BACKGROUND

This application relates to optical communication networks.

Optical ring networks use one or more optical ring paths to optically link optical communication nodes. Each optical ring path may be formed by fibers or other optical links. Such optical ring networks can include a single fiber ring in some implementations and two separate fiber rings in other implementations. Either uni-directional or bi-directional optical communication traffic can be provided in optical ring networks. Optical ring networks can have various applications, including the access part of a network or the backbone of a network such as interconnecting central offices. Optical ring networks can be implemented to provide a protection switch as a "self-healing" mechanism to maintain continuous operation when an optical break occurs in the optical ring and can also allow for relative ease in adding and deleting nodes on the optical ring. In addition, WDM optical rings can provide direct peer-to-peer connections through wavelength add/drops without expensive regenerators. Furthermore, the cost of optical fiber deployment in a ring topology is generally much less than that in a mesh topology. Due to these and other features of optical ring networks, various optical ring networks have been widely deployed in metro and regional local area networks (LANs) for both data communication systems such as a token-ring LAN and Fiber Distributed Data Interface (FDDI) LAN) and telecom systems such as SONET/SDH optical networks.

Like other optical networks, an optical ring network may experience an unexpected break point in the signal traffic. For example, a fiber may break by, e.g., a fiber cut or a failure of an optical component in the ring such as an optical amplifier. The ring topology of optical ring networks allows a protection switching mechanism to be implemented for maintaining the operation of the optical ring network in presence of the break and for restoring the normal operation after the break is repaired.

The current carrier-grade quality of service requires the protection switching time to be less than 50 msec. Different protection switching mechanisms can be implemented in optical ring networks to meet this requirement. For example, SONET rings and resilient-packet-rings (RPRs) have been introduced to support efficient packet switching while meeting carrier-grade quality of service requirements mostly via SONET physical layer interface, including the protection switching time less than 50 msec. SONET or RPR rings currently deployed usually use optical-electrical-optical (O-E-Q) regenerators to connect nodes to the ring and thus the O-E-O conversion is present at every span. This use of the O-E-O conversion can limit the overall capacity of the network to the capacity of the span with the smallest bandwidth in the ring. Therefore, when capacity upgrade is needed in SONET or RPR rings, every span of the ring network needs to be upgraded and such upgrade is referred to as fork lifting update and can be costly. Examples of the fork-lifting upgrade include: (a) a 2.5 G SONET ring grows to a 10 G SONET ring by upgrading every SONET ADMs in all nodes, and (b) a Gigabit Ethernet ring grows to a 10 Gigabit Ethernet ring by upgrading every switch/routers in all nodes.

Alternatively, WDM or DWDM optical ring networks can be implemented with all optical add/drop nodes on the ring without expensive O-E-O regenerator so that nodes are connected directly by multiple DWDM wavelengths to offer much higher capacity, reduced timing jitter, and improved signal latency and to allow for scalability, all at a reduced cost. Such an all-optical DWDM ring network relies on optical layer protection, whose recovery time is normally well within the currently required protection switching time of 50 ms for the carrier-grade quality of service.

SUMMARY

This application describes optical communication ring networks having all optical add/drop ring nodes and a protection switching mechanism using a circulating optical probe signal in each fiber ring for detecting an optical break point in the optical rings and for operating the protection switching mechanism. The optical wavelength of the circulating optical probe signal can be a designated wavelength that is different from optical wavelengths of optical WDM signals carrying WDM signal channels and is, like the optical wavelengths of optical WDM signals, within the operating gain spectral range of optical amplifiers in the optical ring networks.

In one aspect, this application describes an optical communication method in an optical ring network-carrying optical WDM signals and including optical amplifiers operable to amplify light in a gain spectral range covering optical wavelengths of the optical WDM signals. In one implementation, an optical probe signal is coupled to the optical ring network and is at a probe wavelength which is inside or near one end of the gain spectral range to obtain a sufficient optical gain from the optical amplifiers to sustain a detectable signal level. The optical probe signal is monitored in at least one optical node in the optical ring network to detect an optical failure in the optical ring network. A protection switch mechanism in the optical ring network is controlled, in response to a status of the monitored optical probe signal, to sustain communications in the optical ring network outside a location of the optical failure and to automatically restore communications in the optical ring network after the optical failure is repaired.

In another aspect, this application describes an optical communication method that can be implemented as follows. Optical ring nodes are connected to form a optical ring network carrying optical WDM signals in first and second, opposite directions. Each ring node includes at least one optical amplifier operable to amplify light in a gain spectral range covering at least optical wavelengths of optical WDM signals in the optical ring network. If certain node-to-node interspan is short and no optical amplifier gain is needed, the optical amplifier is replaced by a conventional 1×1 optical switch. Each ring node is operable to transmit a first portion of light in the gain spectral range, including the optical WDM signals, and to drop a second portion of the light in the gain spectral range. A first optical probe signal is coupled to the optical ring network to circulate in the optical ring network in the first direction and a second optical probe signal is also coupled to the optical ring network to circulate in the second direction. Each of the first and second optical probe signals is at a probe wavelength within the gain spectral range of each optical amplifier in each ring node. The first and the second optical probe signals are monitored to detect a failure that causes a break in the optical ring network.

In the above method for the optical ring network with first and second optical probe signals, a central protection switch mechanism in a selected ring node can be used and controlled to create a default break point for each circulating optical signal in the optical ring network when there is no break point, other than the default break point, in the optical ring network for each circulating optical signal and to close the default break point when there is a break point in the optical ring network for each circulating optical signal. The selected ring node may be implemented in the following two different configurations.

In a first configuration, the selected ring node is used and operated as a central node to control the central protection switch mechanism and operations of other ring nodes. A node-to-node communication mechanism, such as an optical supervision channel (OSC) signal at an OSC wavelength outside the gain spectral range of each optical amplifier in each ring node, can be used to provide optical communication between two neighboring ring nodes. The optical communication between two neighboring ring nodes via the OSC signal is used to provide communications between the central node and each ring node for operating the central protection switch mechanism and for operating each ring node. Within each ring node, a portion of each of the first and the second optical probe signals is dropped from the ring network while allowing a remainder of each of the first and the second optical probe signals to continue on in the optical ring network and the dropped portion is monitored to detect whether the first and the second optical probe signals are present. The central node is operated to receive information from other ring nodes and to control other ring nodes in response to the received information.

In a second configuration for the selected ring node, the first and the second optical probe signals are coupled to the optical ring network within the selected ring node. The selected ring node is operated to drop a portion of each of the first and the second optical probe signals while allowing a remainder of each of the first and the second optical probe signals to continue on in the optical ring network. The dropped portion is used to monitor presence or absence of the first and the second optical probe signals to decide whether there is a break point elsewhere in the optical ring network. When at least one of the first and the second optical probe signals is absent in the selected ring node, the selected ring node is operated to control the central protection switch mechanism to close the default break point, without relying on information from other ring nodes. When both of the first and the second optical probe signals are present in the selected ring node, the selected ring node is operated to control the central protection switch mechanism to open the default break point.

Also in the second configuration, a ring node, that is not the selected ring node, monitors a total amount of optical power in each of the first and the second directions in the optical ring network, without separately monitoring each of the first and the second optical probe signals alone. Without relying on a command from the selected ring node, the ring node is operated to create a local break point in each of the first and the second directions within the ring node when the total amount of optical power in each of the first and the second directions is detected to be below a shut-off threshold, thus leading to shutting down optical transmission of a neighboring ring node.

In yet another aspect, this application describes various optical communication systems. In one implementation, a system includes optical ring nodes connected to form an optical ring network which carries optical WDM signals the optical ring network includes optical amplifiers operable to amplify light in a gain spectral range covering optical wavelengths of the optical WDM signals. The system also includes an optical probe transmitter coupled to the optical ring network to supply to the optical ring network an optical probe signal at a probe wavelength which is inside or near one end of the gain spectral range to obtain a sufficient optical gain from the optical amplifiers to sustain a detectable signal level. A probe monitor in at least one optical ring node is included in this system to split a portion of the optical probe signal and to monitor the optical probe signal to detect an optical failure in the optical ring network. A protection switch is provided in the optical ring network to create a default optical break point when there is no optical failure in the optical ring network and to close the default optical break point when there is an optical failure. Furthermore, the optical ring network in this system is responsive to a status of the monitored optical probe signal to control the protection switch and the optical ring nodes to sustain communications in the optical ring network outside a location of the optical failure and to automatically restore communications in the optical ring network after the optical failure is repaired.

In yet another implementation, an optical communication system is described to include optical ring nodes connected to form an optical ring network which carries optical WDM signals; and a protection switch in the optical ring network to create a default optical break point when there is no optical failure in the optical ring network and to close the default optical break point when there is an optical failure. In this system, the protection switch includes a first optical terminal to receive an input signal, a second optical terminal to output an output signal, a first optical path comprising first and second optical switches connected in series, and a second optical path comprising third and fourth optical switches connected in series. The first optical terminal is coupled to join a first end of the first optical path and a first end of the second optical path to split the input signal between the first and the second optical paths, and the second optical terminal to join a second end of the first optical path and a second end of the second optical path to combine light from the first and the second optical paths to produce the output signal. This switch can be operated to provide redundancy in switching operations.

These and other implementations, examples and variations are now described in greater detail in the drawings, the detailed description and the claims.

BRIEF DESCRIPTION OF THE DRAWINGS

FIGS. 4A, 4B and 4C show an example operation sequence of the ring network in FIG. 2 when one fiber ring is cut at a location.

DETAILED DESCRIPTION

Figure 1:
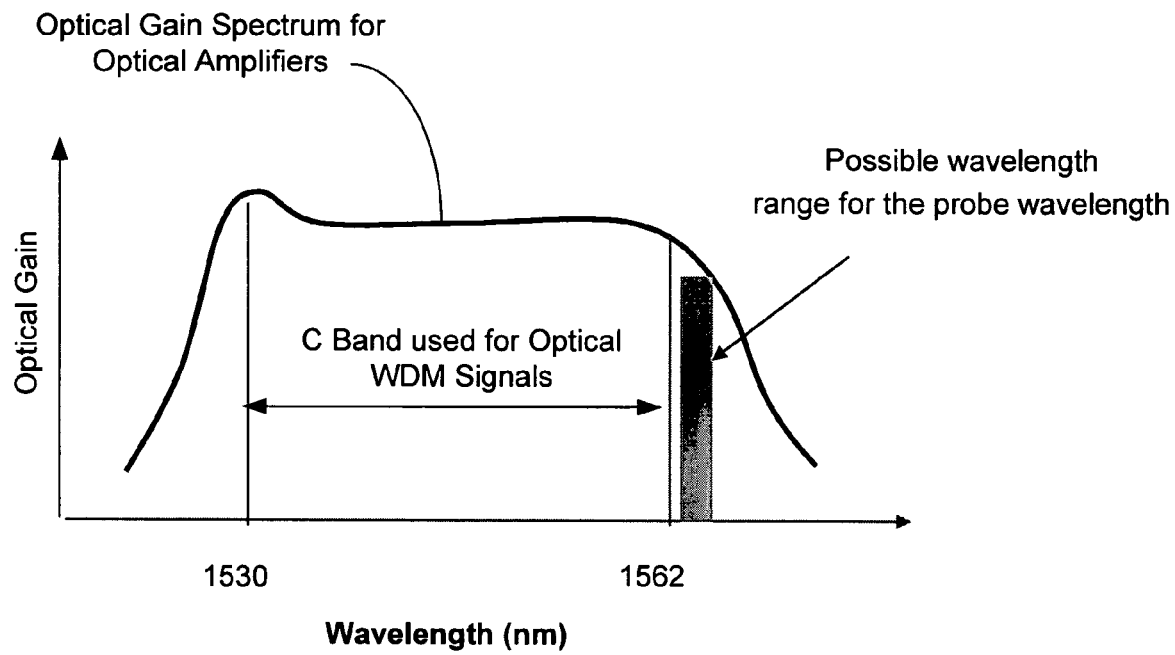
FIG. 1 shows one example of selection of the optical probe wavelength at 1563 nm or 1564 nm beyond the usual spectral range from 1530 nm to 1562 nm in the C band for WDM signals.

Optical ring networks, e.g., in a single fiber ring configuration or a dual-fiber ring configuration, can be used to support optical communication traffic in two opposite directions. Hence, a particular signal channel can be carried by two counter-propagating optical signals in a ring network to provide redundancy. When the optical signal in one direction is blocked or fails to reach a particular ring node, the counter-propagating optical signal carrying the same signal channel can be directed to reach the same ring node via a different route. This is a simple and effective way to improve the reliability of optical ring networks. Optical protection switching in optical ring networks has been designed and deployed based on this simple concept.

Optical protection switching in a ring network described in this application can be implemented to provide, when a failure occurs in the network, a protection mechanism for providing continuous communication traffic amongst the ring nodes that are not at the location of the failure. After the failure is corrected, the optical protection switching can restore or revert the ring network back to its normal state and operation. The reversion back to the normal state can be automatic. In addition, during the normal operation of a ring when there is no optical failure, the optical protection switching can maintain a single default optical break point in a ring or each ring of a network with two or more interconnected rings to prevent formation of a closed optical loop in each ring which can lead to re-circulating of light and thus undesired laser oscillation due to the presence of optical amplifiers in the ring.

In actual implementations, certain designs of the optical ring nodes, the control mechanism, and the protection switching based on the control mechanism can vary significantly in hardware complexity and cost, in system operation and performance, and in system maintenance and reliability. As an example, in metro or regional optical networks, reconfigurable optical add/drop modules (ROADMs) can enable any-to-any (or meshed) traffic pattern on an optical ring network due to the flexibility in dropping/adding any wavelength at any location in ROADM-based ring networks. However, if the optical fiber protection scheme is not designed properly, the impact to the cost and the transmission performance can be significant and may even compromise the flexibility of the ROADMs in ring networks. Some two-fiber optical protection schemes for RODAM-based ring networks provide the protection switch per wavelength. Such designs may not be economically feasible in part because ROADMs are usually applied to an optical ring network with a large number of optical WDM wavelengths, and protection switching based on an individual channel can be costly as the number of optical WDM wavelengths increases. Various other protection schemes are limited in certain aspects, e.g., long transmission distances and delays such as in optical Bidirectional Line Switched Ring (BLSR) protection scheme in the protection switching, penalty in the optical signal-to-noise ratio, and unacceptable interruption of services when the protection switching is activated.

Designs and communication methods for optical communication ring networks described in this application use all optical add/drop ring nodes and a protection switching mechanism to provide reliable communications. A circulating optical probe signal is provided in each direction of the ring network to monitor and detect an optical break point in the ring network and the detected status of the circulating optical probe signal is used to operate the protection switching mechanism. The circulating optical probe signal travels through all ring nodes in the ring network and is common to and shared by all ring nodes. The optical probe wavelength of the circulating optical probe signal can be a designated wavelength that is different from optical wavelengths of optical WDM signals carrying WDM channels and is, like the optical wavelengths of optical WDM signals, within the operating gain spectral range of optical amplifiers in the optical ring networks. This selection of the optical probe wavelength allows the optical probe signal to co-propagate in the same optical path in the ring with the optical WDM signals and to share certain network hardware, e.g., in-line optical amplifiers, with optical WDM signals in the ring. This sharing of hardware can minimize hardware specially deployed for the optical probe signal and thus simplify the network structure and reduce the cost of the network and the maintenance. The optical probe signal is monitored in at least one optical node for detecting an optical failure in the optical ring network.

In implementations, the optical probe wavelength can be selected at a wavelength within the operating gain spectral range of optical amplifiers to achieve certain advantages. For example, the optical probe wavelength can be at or near one end of the gain spectral range with a sufficient optical gain from the optical amplifiers to sustain a detectable signal level, i.e., shorter than the shortest optical WDM wavelength that is used by or reserved for an optical WDM signal, or longer than the longest optical WDM wavelength that is used by or reserved for an optical WDM signal. Depending on the width of the optical gain spectral range of the optical amplifiers, the optical probe wavelength may be selected at the marginal region of one end of the optical gain spectral range with an optical gain less than the gain normally required for a WDM signal channel but still sufficient to sustain the circulating optical signal in the ring at the detectable level. This selection of the optical probe wavelength ensures that the optical probe signal does not occupy any wavelength for the optical WDM channels and leaves the central region of the gain spectral range of the amplifiers for use by WDM signal channels. The optical probe signal is "in band" with the optical WDM signals because they all generally fall in the gain spectral range of the optical amplifiers used in the ring networks. In other implementations, the optical probe wavelength may be at a wavelength in the central region of the operating gain spectral range of optical amplifiers.

FIG. 1 shows one example of the optical probe wavelength at 1563 nm or 1564 nm beyond the usual spectral range from 1530 nm to 1562 nm in the C band for WDM signals. This selection of the optical probe wavelength may be subject to the roll-off at each end of the optical gain spectral range of the optical amplifiers, e.g., a few dB less than the optical gain for the WDM optical signals located within the central region of the optical gain spectral range. As long as the optical gain for the optical probe signal is sufficient to maintain the optical probe signal strength at a detectable level throughout the ring, the probe wavelength for the optical probe signal can be as far away from the WDM signals as possible to preserve as many wavelengths for use for WDM signals. In many WDM ring networks, an optical supervision channel (OSC) is used for node-to-node data communications for the network management and control and is launched at one node and dropped at an adjacent node. The OSC is usually at an "out of band" wavelength outside the spectral range of the WDM wavelengths, e.g., at 1510 nm while WDM signals are around 1550 nm. Such an out-of-band OSC wavelength is not amplified by in-line optical amplifiers for amplifying the WDM signals. Due to this lack of signal amplification and due to the presence of optical loss in the ring, it can be difficult to circulate an OSC signal around the ring and therefore an OSC signal is usually used between two adjacent nodes and not shared by all nodes. At each end of a node, an OSC transceiver is provided to include an OSC transmitter to generate an outgoing OSC signal to the next adjacent node and an OSC receiver to receive an incoming OSC signal from the next adjacent node. Hence, information carried by the OSC is passed on from one node to the next by using an OSC receiver to convert a received OSC signal into an electrical signal and then using the an OSC transmitter to generate a new OSC signal to the next node.

The circulating optical probe signal in each direction of a ring network described in this application is very different from the OSC signals in part because it circulates through all nodes in the ring network without being re-generated at each node, and is shared and used by all nodes. Optical amplifiers stalled in the ring network for amplifying the in-band WDM signals also amplify the optical probe signal to sustain the optical power of the probe signal at a sufficient level. The circulating optical probe signal can be used to provide an effective and efficient way of monitoring and communicating the status of the entire ring. In some implementations, such a circulating optical probe signal can be used exclusively for detecting and communicating an optical failure such as a fiber cut or a device failure in the ring network without carrying other network management and control information and thus a separate node-to-node communication mechanism such as the OSC signaling can be used to communicate other network management and control information to different nodes in the ring network. In other implementations, the circulating optical probe signal can be modulated to carry other network management and control information and to communicate such information to different nodes in the ring network. Hence, a separate node-to-node communication mechanism such as the OSC signaling may be eliminated.

Optical ring networks that implement the circulating optical probe signal for protection switching can have various ring configurations. Both single-fiber rings and dual-fiber rings may be used to support optical traffic in two opposite directions for redundancy. The ring nodes in such ring networks can vary based on specific requirements of the network applications. In some implementations, the ring nodes can be designed to include a central node and regular nodes. The central node can include either an optical switch or an optical amplifier which is shut down in each direction so as to maintain a break point in each direction in the entire ring network. The in-band circulating optical probe signal can be launched and detected at the central node and circulates around the ring except for the default break point in the central node to check and monitor the continuity of the entire ring. If there is any break due to a fiber cut or a component failure in optical fibers, optical amplifiers, or even jumper cables, the propagation of the circulating optical probe is interrupted by the break and can be immediately detected at the central node due to loss of the circulating optical probe in the direction along which the central node is downstream from the location of the break.

Figure 2A:
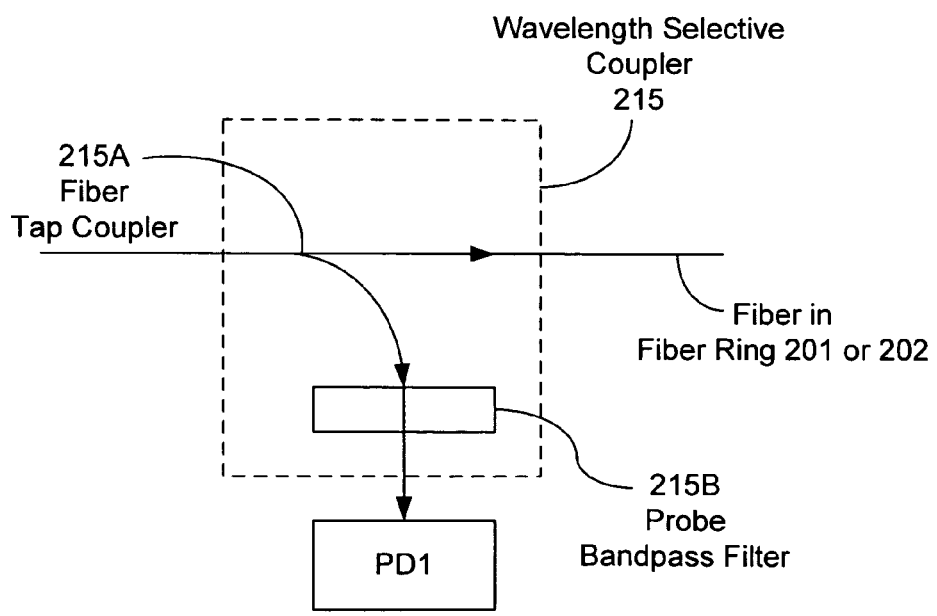
FIG. 2A shows an example of a wavelength selective coupler for selectively dropping a portion of the circulating optical probe signal in each node, where a fiber tap coupler is used to drop a portion of light at all wavelengths and a probe bandpass filter to select only light at the probe wavelength for detection by an optical detector PD1 as the probe detector.
Figure 2:
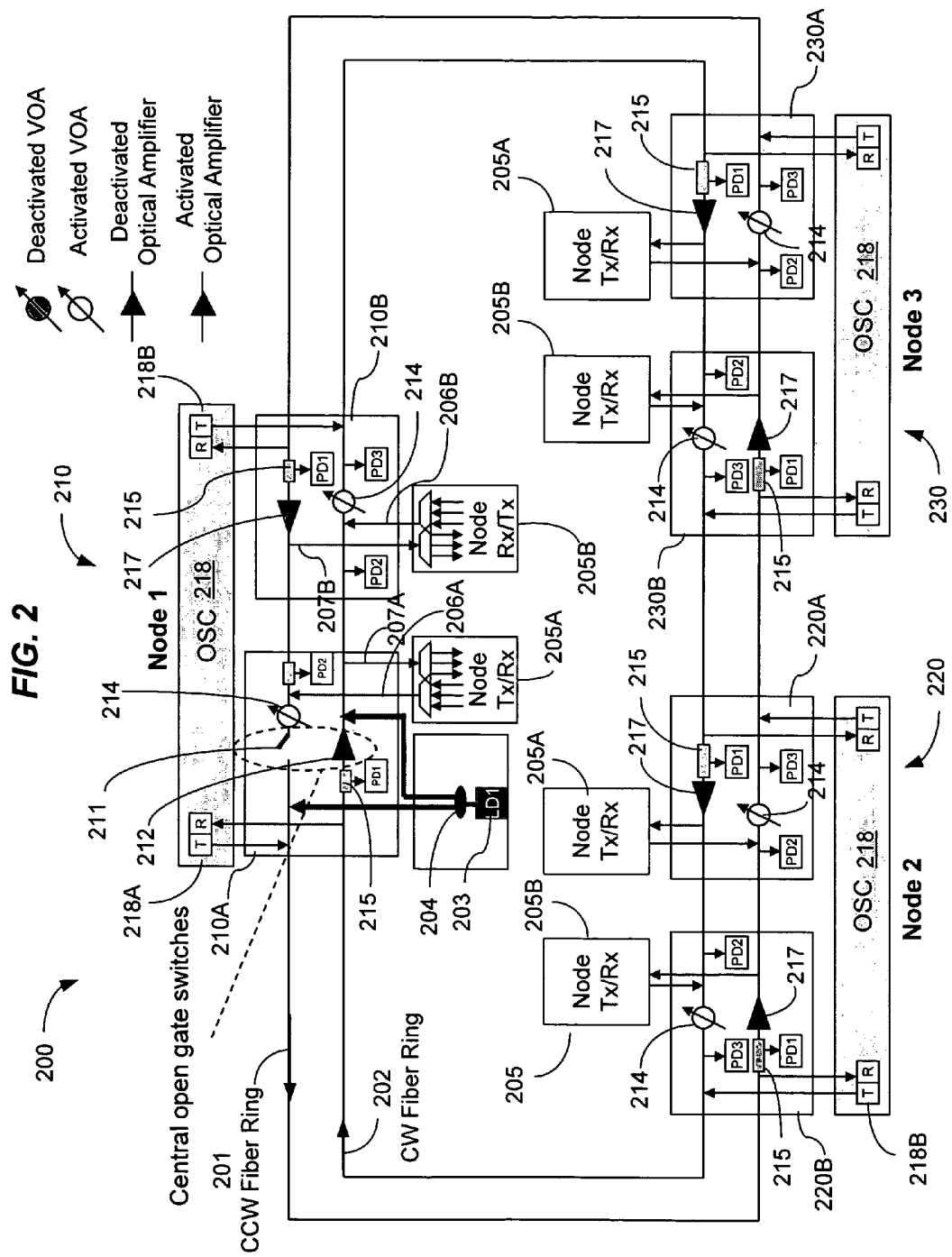
FIG. 2 shows an exemplary dual-fiber ring network having all optical ring nodes in a broadcast-and-select architecture that implements the circulating optical probe signal for protection switching in a centralized control mode.

FIG. 2 shows an exemplary dual-fiber ring network 200 having all optical ring nodes in a broadcast-and-select architecture that implements the circulating optical probe signal for protection switching. This ring network 200 includes optical ring nodes, e.g., nodes 210, 220 and 230, connected in two fiber rings 201 and 202. The fiber ring 202 is a clockwise (CW) fiber ring where each optical signal circulates in the clockwise direction and the fiber ring 201 is a counter clockwise (CCW) fiber ring where each optical signal circulates in the counter clockwise direction.

The ring nodes in the ring network 200 include a central node 210 and regular ring nodes 220 and 230. As an example, each ring node can be implemented with two amplifier line cards each having an optical amplifier for signal amplification in one of the two counter-propagating directions. The central node 210 in this example has a first amplifier line card 210A as the interface on one side of the node 210 that has an optical amplifier 212 to amplify WDM signals and the circulating optical probe in the clockwise direction, and a second amplifier line card 210B as the interface on the other side of the node 210 that has an optical amplifier 216 to amplify WDM signals and the circulating optical probe in the counter clockwise direction. The amplifier line card 210A adds one or more add WDM signals in the counter clockwise direction and drops WDM signals in the clockwise direction for the node 210. The amplifier line card 210B adds one or more add WDM signals in the clockwise direction and drops WDM signals in the clockwise direction for the node 210. Hence, light in the clockwise direction in the network 200 enters the central node 210 via the amplifier line card 210A and leaves the node 210 via the amplifier line card 210B. Regular ring nodes 220 and 230 are similarly constructed with amplifier line cards 220A and 220B, 230A and 230B, respectively.

The regular ring nodes 220 and 230 can be configured to share the same node structure with identical node components. The central node 210 has a different node construction from the regular ring nodes 220 and 230 and includes central gate switches 211 and 212 in the two fiber rings 201 and 202, respectively, and an optical probe transmitter 203 that generates the circulating optical probe signal. In addition, the central node 210 has a network control mechanism that analyzes data from regular ring nodes 220 and 230 and sends out node control commands to the regular ring nodes 220 and 230 for execution of certain node operations. Under this design, each regular ring node detects the circulating optical probe signal and other signals and reports the detected data to the central node 210. The central node 210 processes detected data obtained within its own node and received detected data from regular ring nodes 220 and 230, and in response, controls certain actions in the regular ring nodes 220 and 230 to carry out the protection switching. As such, the design in the ring network 200 is a centralized control design and all decisions and actions for protection switching are controlled by the central node 210.

In this centralized control mode, the network 200 uses node-to-node communication signals for exchanging data and messages between the central node 210 and the regular ring nodes 220 and 230. Such node-to-node communication signals are present in the ring network 200 along with the circulating optical probe signal and the optical WDM signals. Various node-to-node communication techniques may be implemented. The network 200 in FIG. 2 shows an example of a node-to-node communication mechanism based on optical supervision channels (OSCs) that use out of band optical wavelengths to provide optical communication between two neighboring nodes for managing and operating the protection switching mechanism according to predetermined control algorithms for maintaining a single break point (or a single break span) in each ring path. Other node-to-node communication mechanisms different the OSC signaling may also be used to carry other network management and control information to different nodes in the ring network.

As illustrated, each node includes an OSC module 218 with OSC transmitters and receivers for generating and receiving OSC signals in the two separate fibers 201 and 202. Because each node has two neighboring nodes, the OSC module 218 includes two OSC transceivers 218A and 218B for communicating with the two neighboring nodes, respectively. Referring specifically to the central node 210 and the ring node 220, the OSC transceiver 218A in the central node 210 has an OSC transmitter (T) to send an OSC signal in the counter clockwise direction in the fiber ring 201 via the line card 210A to the OSC receiver (R) in the OSC transceiver 218B of the ring node 220 via the line card 220B. The OSC receiver (R) in the OSC transceiver 218A of the central node 210 receives the OSC signal in the clockwise direction in the fiber ring 202 via the line card 210A from the OSC transmitter (T) in the OSC transceiver 218B of the ring node 220. Wavelength-selective OSC couplers (not shown) such as optical filters can be used to add and drop the OSC signals while allowing the optical probe signal and the optical WDM signals to pass through. Therefore, the OSC signaling between two neighboring nodes allows for the node-to-node communication. For OSC signaling between two non-neighboring nodes, an intermediate node can relay the OSC data from its OSC transceiver 218A on one side to its OSC transceiver 218B on the other side.

Each ring node, including both the central node 210 and a regular ring node (e.g., 220 and 230), has an optical WDM add/drop module to generate optical add signals 206A and respective replicas 206B to the two different fiber rings 201 and 202 in the two opposite directions and to receive optical drop signals-207A and 207B from the two different fiber rings 201 and 202. Optical broadband couplers can be used to provide the optical add and drop couplings while allowing the optical probe signal and the optical WDM signals to continue to propagate after passing each node and after a small portion of all the WDM signals and the circulating optical probe signal is split off and dropped to the node. The ring network 200 in FIG. 2 is a broadcast and select network in the context that each node can broadcast an optical WDM signal to all nodes and select one or more desired channels from the dropped signal which contains all optical WDM channels in the network to receive. One or more fixed or tunable optical filters may be used to select one or more desired WDM channels for each node from the optical drop signals 207A and 207B. A WDM demultiplexer may also be used to separate the dropped WDM signals in the drop signals 207A or 207B and then the one or more desired WDM channels are detected and processed to extract data.

Various designs for the add/drop module may be used in FIG. 2. In the example in FIG. 2, the add/drop module has first and second add/drop modules 205A and 205B that are respectively coupled to two line cards on two sides of each node, respectively. The module 205A has a transmitter to add one or more WDM signals to the fiber ring 201 in the counter clockwise direction while dropping all WDM channels from the fiber ring 202 in the clockwise direction. The module 205B has a transmitter to add one or more WDM signals to the fiber ring 202 in the clockwise direction while dropping all WDM channels from the fiber ring 201 in the counter clockwise direction. The signal add and drop functions at each node can be implemented by using a broadband coupler such as a fiber tap coupler on the ring to drop or add optical signals and an off-ring optical splitter coupled with one or more optical filters or an optical demultiplexer to separate dropped signals, and an off-ring 1×N combiner or multiplexer to combine different add signals together for coupling to the ring via broadband coupler on the ring. Different optical add signals produced from different optical transmitters in each node can be combined by a wavelength multiplexer or a 1×N combiner. Both an optical transmitters operating at a fixed laser wavelength and a tunable optical transmitter producing a tunable laser wavelength may be used to produce an add optical signal.

The central node 210 is designed to place the signal add coupler and the signal drop coupler on the same side of the gate switches 211 and 212 for the protection switching. Two optical couplers for coupling two optical probe signals for the two opposite directions in the ring network are respectively placed on two opposite sides of the gate switches 211 and 212 so that the opening and closing of the gate switches 211 and 212 do not affect coupling the optical probe signals to the ring network.

Each regular ring node 220 or 230 in FIG. 2 has one optical amplifier 217 in each fiber to amplify light in one of the two counter-propagating directions so there are two amplifiers 217 in each regular node 220 or 230. These two amplifiers 217 in each regular ring node can be located in two separate amplifier line cards. Under a normal operating condition, each optical amplifier 217 in a regular ring node 220 or 230 is activated and turned on to amplify light. When there is a break outside the central node 210 in the ring network 200, as part of the protection switching, at least one optical amplifier 217 in one or two regular ring nodes adjacent to the break point is turned off and becomes deactivated to function as an open optical switch to create a protective break point. In the specific example for the central node 210 in FIG. 2, however, the optical amplifier 212 in the fiber ring 202 is, in addition to its optical amplification function, used and operated as an optical gate switch to provide a default optical break point in the ring 202. In operation, the optical amplifier 212 is turned off to create the default break point under a normal operation condition and is tuned on to close the default break point and thus operates as an amplifier when there is a break point elsewhere in the ring network 200. The other optical amplifier 217 in the fiber ring 201 in the central node 210 generally operates as a "regular" optical amplifier.

In some ring networks, two or more adjacent nodes may be separated from one another over a relatively short fiber span and the optical loss over this short fiber span is sufficiently small so that at least one of these adjacent nodes does not need to have an optical amplifier in each of the two fiber rings. Such a node without an optical amplifier can be either a central node or a regular node. In absence of the optical amplifier, this node can use an optical switch, e.g., an 1×1 optical switch, to provide the local optical switching function in this node to create a protective optical break point as part of the optical protection switching.

The above use of the amplifier as the gate switch 212 in the central node 210 is efficient because a separate switch for the gate switch 212 is eliminated. When the gate switch 212 in the central node 210 is closed, an amplifier in the fiber ring 202 within the central node 210 can be used to balance the signal strengths out of the central node 210 in both fiber rings 201 and 202. An amplifier as the gate switch 212 can perform both optical switching function and the optical amplification function. As an alternative, the gate switch 212 in the fiber ring 202 within the central node 210 may be implemented by a combination of an optical amplifier and a real optical gate switch like the optical switch 211 in the fiber ring 201, or simply an optical switch without optical amplifier if the optical gain is not needed. In addition, a combination of an optical amplifier and a variable optical attenuator (VOA) with a sufficient extinction ratio and fast switching time may be used as the gate switch 212. An VOA can be configured and operated to exhibit a high optical attenuation and a low optical attenuation and can be adjusted to operate at a variable attenuation level between the high and the low attenuation levels. When the high attenuation in the VOA is sufficiently high to suppress the optical transmission below a desired level, the transmission of the VOA is "darkened" or deactivated and thus can operate like an optical switch in an open position. Certain optical switching operations described in this application are based on switching operation of a VOA.

In FIG. 2, each node is designed to place each optical amplifier (217, 216 or 212) coupled in one fiber ring 201 or 202 at a location upstream from a broadband coupler for dropping WDM signals from the ring into the node. In the central node 210, for example, the optical amplifier and gate switch 212 in the line card 210A is located upstream from the broadband coupler in the clockwise fiber ring 202 that splits the traffic in the ring 202 to produce optical drop signals 207A. The other optical amplifier 216 in the line card 210B of the central node 210 is located upstream from the broadband coupler in the counter clockwise fiber ring 201 that splits the traffic in the ring 201 to produce optical drop signals 207B.

In addition, corresponding to each optical amplifier (217, 216 or 212) coupled in one fiber ring within each node, a VOA 214 is placed in the other fiber ring within the same node at a location downstream from a broadband coupler for adding one or more WDM signals from the node onto the ring. In the central node 210, for example, the VOA 214 in the line card 210A is located downstream from the broadband coupler in the counter clockwise fiber ring 201 that adds one or more optical add signals 206A to the ring 201 and is upstream from the gate switch 211. The other VOA 214 in the line card 210B of the central node 210 is located downstream from the broadband coupler in the clockwise fiber ring 202 that adds one or more optical add signals 206B to the ring 202.

Under this node design, each node has an upstream optical amplifier at the entrance of the node to amplify received optical signals in each fiber ring and a downstream VOA at the exit of the node in each fiber ring to control the optical power of each signal going out of the node. Signal adding and dropping functions are implemented in each node between the upstream optical amplifier and the downstream VOA. In addition, a wavelength-selective optical coupler 215 is coupled at an upstream location from the upstream optical amplifier in each node to selectively split a portion of the circulating probe signal for detecting the circulating probe signal at the entrance of the node. This use of the VOA and the detection design in each node allow the circulating optical probe signal at the probe wavelength, the added DWDM wavelengths or upstream ASE noise to propagate through a repaired fiber break to a downstream node and be detected by a detector in the downstream node. As a result, when a fiber break is repaired, the system can be automatically informed of the status of the repair without human intervention and can automatically revert the system back to the normal operation after the repair is completed. These and other features in the node design can be used to achieve various operations associated with the protection switching based on the optical circulating probe signal.

Both gate switches 211 and 212 are in the line card 210A of the central node 210. The gate switch 211 is downstream from the location where one or more added WDM signals are added to the fiber ring 201 in the counter clockwise direction and is upstream from the location where the circulating optical probe is added to the fiber ring 201 in the counter clockwise direction. The gate switch 212 is upstream from the location where one or more added WDM signals are added to the fiber ring 202 in the clockwise direction and the location where the circulating optical probe is added to the fiber ring 202 in the clockwise direction. Alternatively, both gate switches 211 and 212 can be implemented in the line card 210B of the central node 210.

The generation and detection of the circulating optical probe signal are implemented as follows in the network 200 in FIG. 2. The optical probe signal in each direction is generated from the probe transmitter 203 inside the central node 210. The probe transmitter 203 can be a laser operable to produce laser light at a desired probe wavelength. An optical splitter or coupler 204 can be used to split the optical probe signal into a first optical probe signal and a second optical probe signal that are respectively launched into the two counter propagating directions in the network 200. Two optical probe couplers are respectively coupled to the fiber rings 201 and 202 to couple the first and second optical probe signals onto the fiber rings 201 and 202 in opposite directions. Each optical probe coupler is located in each fiber ring downstream from a respective gate switch in the central node 210. In the example in FIG. 2, the optical probe coupler for coupling the optical probe signal to the counter clockwise ring 201 is downstream from the gate switch 211 in the line card 210A so that the switching operations of the gate switch 211 do not affect coupling of the optical probe signal to the ring 201. Similarly, the optical probe coupler for coupling the optical probe signal to the clockwise ring 202 is downstream from the optical amplifier as the gate switch 212 so that the switching operations of the gate switch 212 do not affect coupling of the optical probe signal to the ring 202.

The loss of the optical probe signal at a particular location in the ring network 200 in FIG. 2 can be caused by either an optical break in the ring or the failure of the probe transmitter 203. These two causes need be handled differently. In order to distinguish the loss of the optical probe signal caused by an optical break in the ring from the loss of the optical probe signal caused by the failure of the probe transmitter 203, a probe transmitter photodetector can be implemented to monitor the optical output of the probe transmitter 203 and thus detect whether the probe transmitter 203 generates the probe light. In one implementation, a beam splitter is placed in the optical path of the optical output of the probe transmitter 203 to split a small fraction of the probe light into the probe transmitter photodetector. In another implementation, the probe transmitter photodetector can be a photodetector at the back facet of the laser diode used as the probe transmitter 203 to monitor laser light output at the back facet of the laser diode. The detected signal from the probe transmitter photodetector can be used by the control unit of the central node 210, such as the element management system (EMS), to control the protection switching mechanism. When the probe transmitter photodetector indicates a failure of the probe transmitter 203, the loss of the optical probe signal in other nodes of the ring is not treated as an optical break and the protection switching is not effectuated. A service request is generated for repairing or replacing the failed probe transmitter 203. When the probe transmitter photodetector indicates a normal operation of the probe transmitter, the loss of the optical probe signal in the ring triggers the protection switching mechanism.

A back-up probe transmitter may be provided for backing up the probe transmitter 203 and is turned on to produce the first and the second optical probe signals when the default probe transmitter 203 fails. Alternatively, two separate probe transmitters may be used to produce the first and the second optical probe signals, respectively, for the two directions of the ring and each of the two probe transmitter may be replicated for redundancy.

A first optical probe coupler is coupled to the fiber ring 201 at a location downstream from the gate switch 211 in either line card 210A or line card 210B to add the first optical probe signal onto the fiber ring 201 to propagate in the counter clockwise direction. The first optical probe coupler on the fiber ring 201 is designed to allow the optical WDM signals and first optical probe signal to pass through in the fiber ring 201. A second optical probe coupler is coupled to the fiber ring 202 at a location downstream from the gate switch 212 in either line card 210A or line card 210B to add the second optical probe signal onto the fiber ring 202 to propagate in the clockwise direction. Similar to the first optical probe coupler, the second optical probe coupler on the fiber ring 202 is also designed to allow the optical WDM signals and second optical probe signal to pass through in the fiber ring 202. Hence, under a normal operating condition when each of the optical gate switches 211 and 212 is open to create a single default break point in each of the two fiber rings 201 and 202, the optical probe signal, i.e., each of the first and the second optical probe signals, circulates the entire fiber ring except for the default break point.

Notably, in the illustrated centralized control mode, each node is designed to selectively drop a portion of each of the first and the second optical probe signals at the entrance of each node for each fiber while allowing a remainder of each of the first and the second optical probe signals to continue on in the optical ring network 200. Hence, each optical probe signal circulates in the entire ring and is used to detect a break point caused by optical failure outside the central node 210. This aspect of the central node 210 and a regular ring node 220 is described below.

In the central node 210, a wavelength-selective optical coupler 215, such as an optical filter, is coupled at an upstream location from the gate switch 212 and located at near the entrance of the central node 210 in the fiber ring 202 where the light propagates in the clockwise direction. The wavelength-selective optical coupler 215 selects and splits a small portion of the second optical probe signal from the fiber ring 202 to drop as a local probe monitor signal while allowing all optical WDM signals and the majority of the second optical probe signal to pass through. A probe detector PD1 is used to detect the dropped local probe monitor signal. This allows for detecting the presence of the second optical probe signal at the entrance to the central node 210 in the fiber ring 202. Similarly, another wavelength-selective probe coupler 215 and a respective probe detector PD1 are coupled at an upstream location of the optical amplifier 217 in the fiber ring 201 to detect the presence of the first optical probe signal at the entrance to the central node 210 in the fiber ring 201.

FIG. 2A shows an example of the wavelength selective coupler 215 in FIG. 2 for selectively dropping a portion of the circulating optical probe signal in each node. The wavelength selective coupler 215 includes a fiber tap coupler 215A coupled on the main fiber line in either fiber ring 201 or fiber ring 202 to drop a portion of light at all wavelengths and a probe bandpass filter 215B in the optical path of the dropped light from the fiber tap coupler 215A to select only light at the probe wavelength for detection by the optical probe detector PD1 while rejecting light at other wavelengths.

Turning now to the regular ring node 220, a wavelength-selective optical coupler 215 is coupled at an upstream location from the amplifier 215 in the fiber ring 201 where the light propagates in the clockwise direction and enters the node 220. A probe detector PD1 is used to receive a dropped local probe monitor signal from the fiber ring 201 and to detect the presence of the first optical probe signal at the entrance to the ring node 220 in the fiber ring 201. Similarly, another wavelength-selective probe coupler 215 and a respective probe detector PD1 are coupled at an upstream location of the optical amplifier 217 in the fiber ring 202 to detect the presence of the second optical probe signal at the entrance to the ring node 220 in the fiber ring 202. Other ring nodes such as the ring node 230 have a similar design for coupling and detecting the optical probe signal. Backup units for the above probe transmitter 203 and the probe detectors PD1 may be used to provide redundancy for the generation and detection of the circulating optical probe signal and to improve the reliability of the protection switching.

In addition to the probe detectors PD1, each node can include an optional optical detector PD2 coupled to the fiber line at a location downstream from each amplifier within the node as an optical monitor for the optical amplifier. An optical coupler can be used to couple a fraction of the light in the fiber line into the optical detector PD2. When the optical amplifier upstream from the optical detector PD2 in that node fails, the optical detector PD2 detects a loss of light below a predetermined threshold level. The failure of the optical amplifier in this node shuts down all optical signals passing through the failed optical amplifier and thus triggers the protection switching mechanism due to the detected loss of the optical probe at one or more nodes in the ring. The detected result from each optical detector PD2 can be reported to the central node 210 via a node-to-node communication mechanism such as the OSC signaling described above. The loss of light detected at the detector PD2 may be caused by an upstream optical break other than the failure of the optical amplifier, e.g., a device failure in an upstream node or a fiber cut at an upstream location. The central node 210 can determine the cause for the loss of signal at the PD2 based on received information based on detection data obtained at other detectors and other nodes.

A second optional optical detector PD3 may also be coupled to a fiber ring downstream from a VOA 214 in each node to monitor the VOA 214. An optical coupler can be used to couple a fraction of the light in the fiber line into the optical detector PD3. When the VOA 214 upstream from the optical detector PD3 in that node fails, the optical detector PD3 detects a loss of light below a predetermined threshold level and this failure also triggers the protection switching mechanism. The detected result from each optical detector PD3 can be reported to the central node 210 via a node-to-node communication mechanism such as the OSC signaling described above. The loss of light detected at the detector PD3 may be caused by an upstream optical break other than the failure of the VOA, e.g., the failure of the upstream amplifier in the same node, a failure in an upstream node or a fiber cut at an upstream location. The central node 210 can determine the cause for the loss of signal at the PD3 based on received information based on detection data obtained at other detectors and other nodes.

With the above design in FIG. 2, each node can be operated to monitor the circulating optical probe signal at the "in band" probe wavelength by monitoring the dropped probe monitor signal at each PD1 to determine whether the first and the second optical probe signals are present. The detected status of each of the first and second optical probe signals in each node is then transmitted from each regular ring node to the central node 210 by using the OSC signaling between two neighboring nodes. The central node 210 collects the reported data on status of the circulating optical probe signal from the nodes in the ring network 200 and processes the reported data to decide (1) whether there is a break point and (2) if so, the location of the break point. If no node reports loss of the either of the first and second optical probe signals, the central node 210 keeps both gate switches 211 and 212 open in the fiber rings 201 and 202, respectively, and to keep other ring nodes at their normal operation modes where each optical amplifier 217 is turned on or activated to amplify light of the optical WDM signals and the circulating first and second optical probe signals carried in the fiber rings 201 and 202 and each VOA 214 is set at an appropriate attenuation level to allow optical transmission of the optical WDM signals and the circulating first and second optical probe signals. FIG. 2 illustrates the normal operation mode for each node.

When there is a break point at a location outside the central node 210 in either one or both of the two fiber rings 201 and 202, at least one node including the central node 210 can detect the loss of the optical probe signal (either or both of the first and the second optical probe signals). From the status of the optical probe signal from all nodes, the central node 210 can determine the location of the break point. For example, if the break point in the fiber ring 201 occurs between the nodes 220 and 230, the dropped probe monitor signals for dropping a portion of the first optical probe signal become absent from the probe detectors PD1 coupled to the fiber ring 201 in the node 230 and the central node 210. All other probe detectors PD1, including all probe detectors PD1 in the fiber ring 202, still detect the presence of their respective optical probe signals. Hence, the reported data from the nodes via the OSC signaling to the central node 210 provides a "probe status map" which can be processed by the protection switching control software or hardware logic in the central node 210 to determine the location of the break point. Detectors PD2 and PD3, if implemented, can be reported to the central node 210 to provide more detailed information regarding the nature of the failure and such information can facilitate determining the location and exact nature of the failure.

After the break point between two regular ring nodes or within a ring node (e.g., a failure of an optical amplifier, a failure of a jumper between line cards, or a VOA failure inside a node) is detected, e.g., a break point between the nodes 220 and 230, the central node 210 activates the protection switching mechanism to close the two default break points at the gate switches 211 and 212 inside the central node 210 and send commands using the OSC signaling to cause one protective optical break point in each of the two ring nods to cut off light in both the first and the second directions, e.g., in both fiber rings 201 and 202. Hence, optical communication traffic in both directions that goes through the location of the break point is cut off and is re-routed through the central node 210 by closing the default break point in each of the two directions, e.g., the two fiber rings 201 and 202. After the break point is repaired, the default break point in the central node 210 is restored and the protective optical break point in each of the two ring nodes is closed to restore transmission of light through the two ring nodes. During this process, the circulating optical probe signal is monitored at all nodes to provide the connection status of the network to the central node 210.

In the ring network 200 under the centralized control design, both gate switches 211 and 212 can be synchronized to open or close together. The switching states depend whether the probe wavelength is present (both gate switches open) or absent (both gate switches closed). The loss of the optical probe signal can be caused by a fiber cut between nodes or a node failure such as a failed VOA or amplifier inside a node. The following sections describe examples of protection switching in the ring network 200.

Figure 3A:
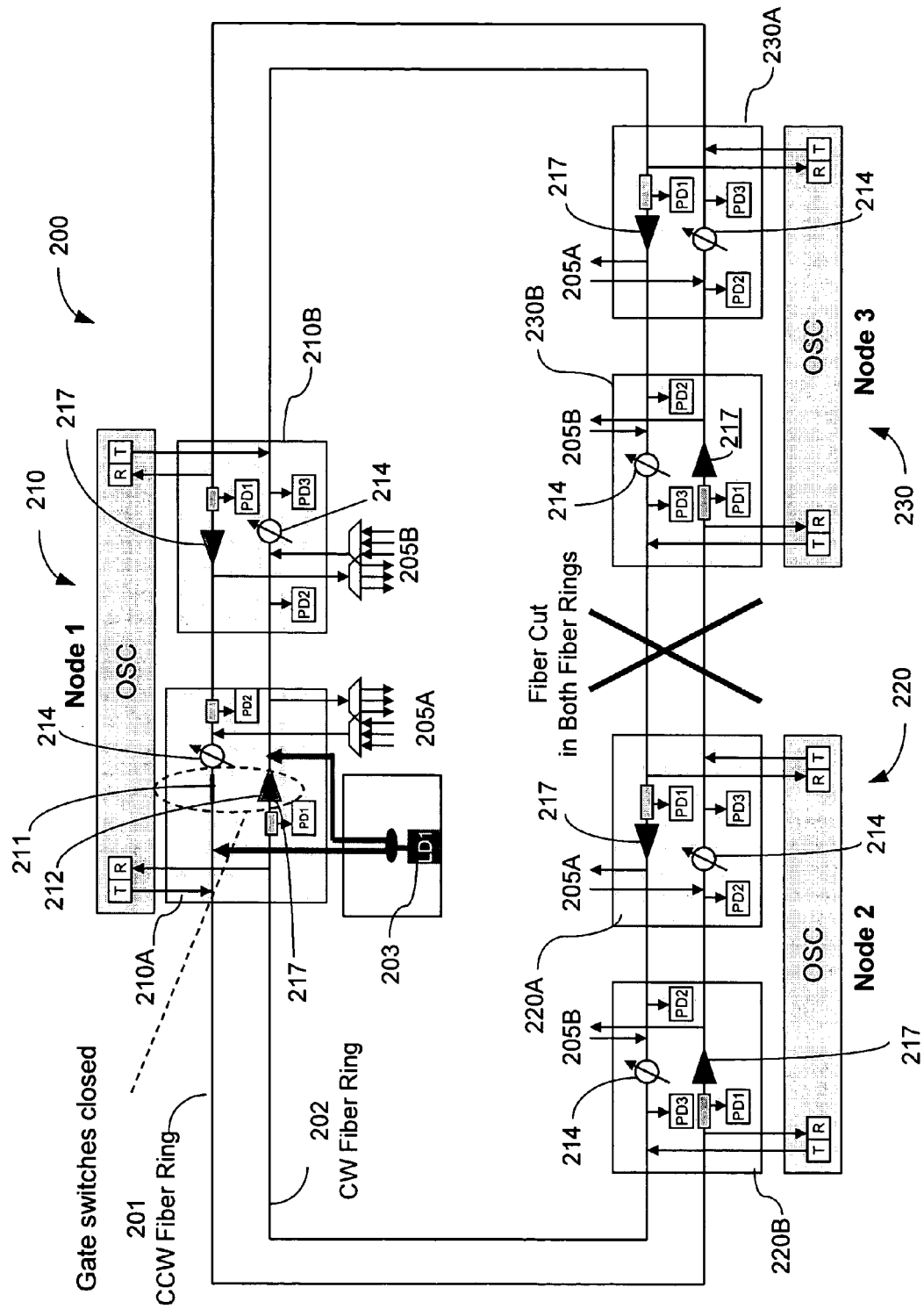
FIGS. 3A, 3B, 3C and 3D show an example operation sequence of the ring network in FIG. 2 when both fiber rings are cut at a location.

FIGS. 3A, 3B, 3C and 3D show an example of the protection switching operations in the dual-fiber ring network 200 in FIG. 2 when both fiber rings 201 and 202 are cut and later repaired. In FIG. 3A, after the fiber rings 201 and 202 are cut at a location between the ring nodes 220 and 230, the first and second optical probe signals are lost at the probe detectors PD1 in both fiber rings 201 and 202 within the central node 210. This local event within the central node 210 triggers the central node 210 to close the two gate switches 211 and 212. When the gate switch 212 is an amplifier as illustrated, the amplifier is turned off under a normal condition and is now turned on to close the gate switch when a fiber cut is detected. This action in the central node 210 is taken based on a local detection of the optical probe signal by either one of the two probe detectors PD1 within the central node 210. This action allows the optical traffic that is blocked by the fiber cut between the nodes 220 and 230 to reroute via the central node 210 and thus communications in the ring network 202 can be maintained. At this time and prior to all status reporting data from other nodes is received, the central node 210 does not know the location of the optical failure caused by the fiber cut.

The nodes 210 and 220 report their status to the central node 210 via the OSC signaling. The status of nodes 220 and 230 is as follows. The ring node 220 still detects the first optical probe signal at its probe detector PD1 in the fiber ring 201 but loses its second optical probe signal in its probe detector PD1 in the fiber ring 202. Any ring node between the central node 210 and the node 220, if present, would have detected the same probe signal status as in the node 220. In the ring node 230, the first optical probe signal in the fiber ring 201 is missing at the probe detector PD1 in the fiber ring 201 while the second optical probe signal is present. Similarly any node present between the central node 210 and the node 230 would have the same probe signal status as in the node 230. Hence, after the status reporting data from the nodes is received, the central node 210 can process the data and determine the location of the optical failure to be between nodes 220 and 230.

Figure 3B:
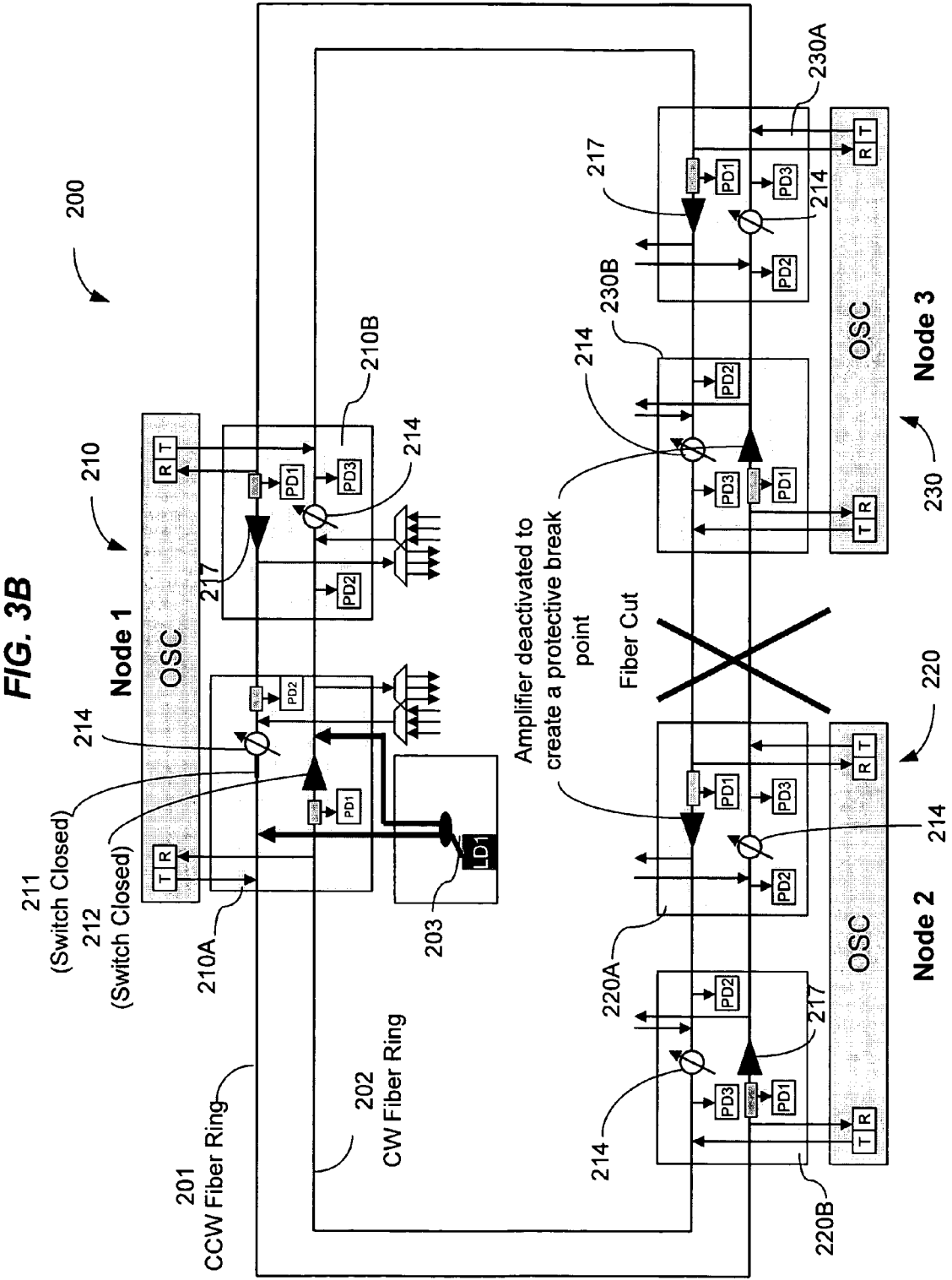

Based on this determination, the central node 210 sends out commands, via the OSC signaling, to the nodes 220 and 230 to create a protective break point in each fiber downstream from the location of the fiber cut to block any optical traffic through the fiber span between the nodes 220 and 230 even if the fiber cut is repaired. In the fiber ring 201, the downstream node from the location of the fiber cut is the node 220 and thus the optical amplifier 217 in the fiber ring 201 within the node 220 is turned off or deactivated to create a protective break point in the fiber ring 201. In the fiber ring 202, the downstream node from the location of the fiber cut is the node 230 and thus the optical amplifier 217 in the fiber ring 202 within the node 230 is turned off or deactivated to create a protective break point in the fiber ring 202. This is shown in FIG. 3B. Notably, the optical communication elsewhere in the ring network 200 is maintained in FIG. 3B. The use of the amplifier in the downstream node from the fiber cut in each fiber for the protection switching allows the probe detector PD1 to automatically detects the status of the upstream fiber cut and when the fiber cut is repaired by monitoring the optical probe signal at all time and thus notifies the central node 210.

Figure 3C:
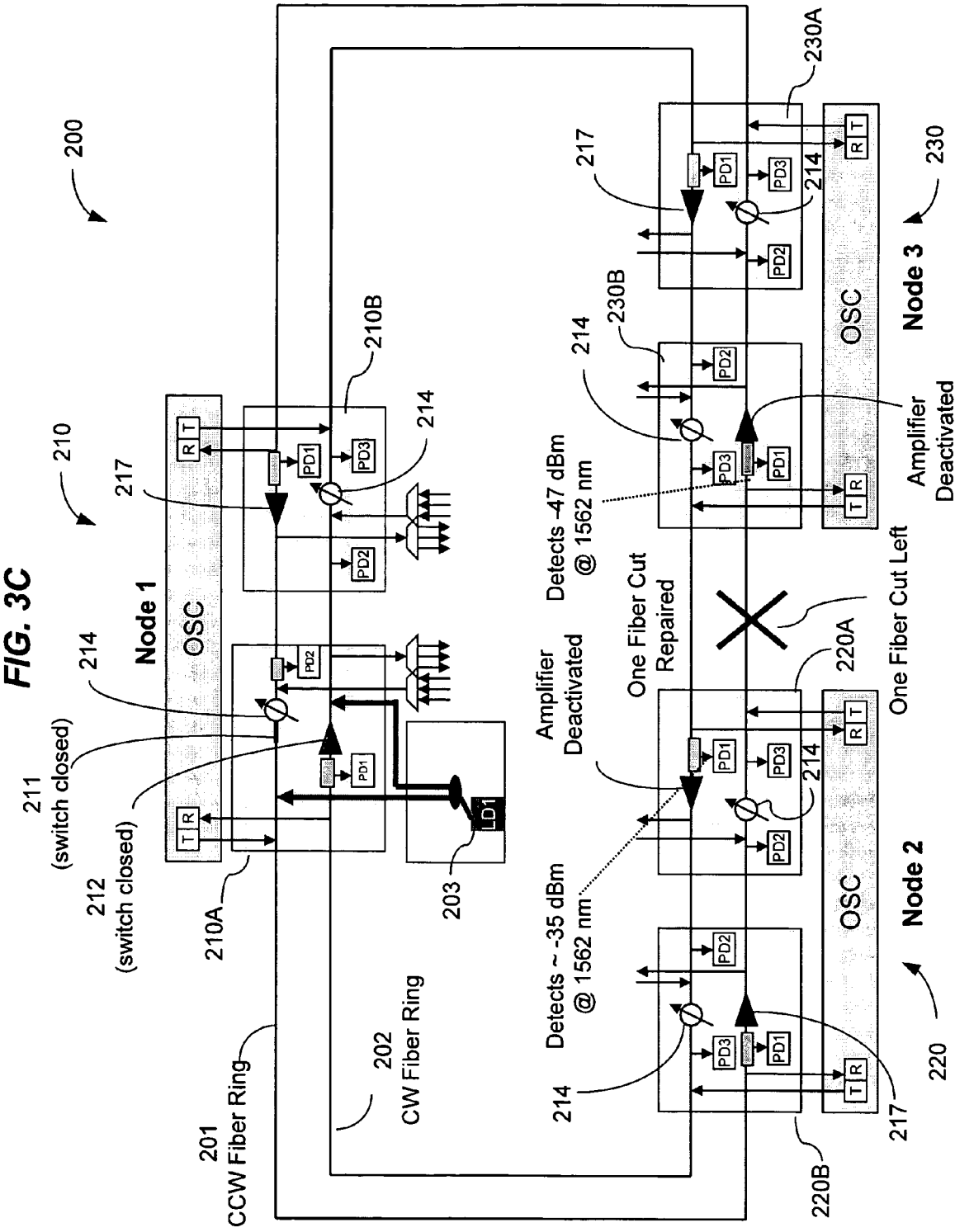

Next, the fiber cut can be repaired by dispatching a field repair person or crew. During the repair process, the protection switching condition shown in FIG. 3B remain unchanged. FIG. 3C shows an example where one fiber cut in the fiber ring 202 is repaired while the fiber cut in the fiber ring 201 still remains. This condition is reported to the central node 210 via the OSC signals sent from the nodes 220 and 230. Under this condition, the gate switches 211 and 212 in the central node 210 remain closed to continue rerouting the optical traffic through the central node 210 and the deactivated amplifiers in the nodes 220 and 230 remain deactivated to block optical traffic between the nodes 220 and 230. This status of the network 200 is shown in FIG. 3C. Due to the node structure illustrated in FIG. 2, an optical amplifier 217 in a node downstream from the fiber break is turned off and is thus operated as an optical open switch to block the transmission. At this time, a VOA 214 in an adjacent node upstream from the fiber break remains at an optical transmissive state without completely blocking light. This use of the VOA in the upstream node allows the downstream neighbor node to detect whether or not a fiber cut is repaired by detecting the presence of the probe wavelength via the wavelength selective coupler 215 and the probe detector PD1. In a normal operation condition, a VOA 214 can be adjusted such that the optical power per wavelength at the input to the optical amplifier in the downstream neighbor node is at around –25 dBm or higher, and the probe wavelength power could be the same or slightly lower. As an example, the detected probe wavelength power at the optical detector PD1 under a normal operation condition can be around –35 dBm (assuming a tap coupler with a 10% coupling ratio is used to split 10% of the light to the detector PD1), as shown in PD1 at the node 220 in FIG. 3C. This will be the case when a fiber cut is repaired (or when there is no fiber cut) and a minimum of –35 dBm is detected. If the fiber cut is not repaired, the probe light is completely blocked by the fiber cut, and the detected power at the probe detector PD1 is the detector's sensitivity limit, e.g., –47 dBm in the example shown in the node 220 in FIG. 3C.

Figure 3D:
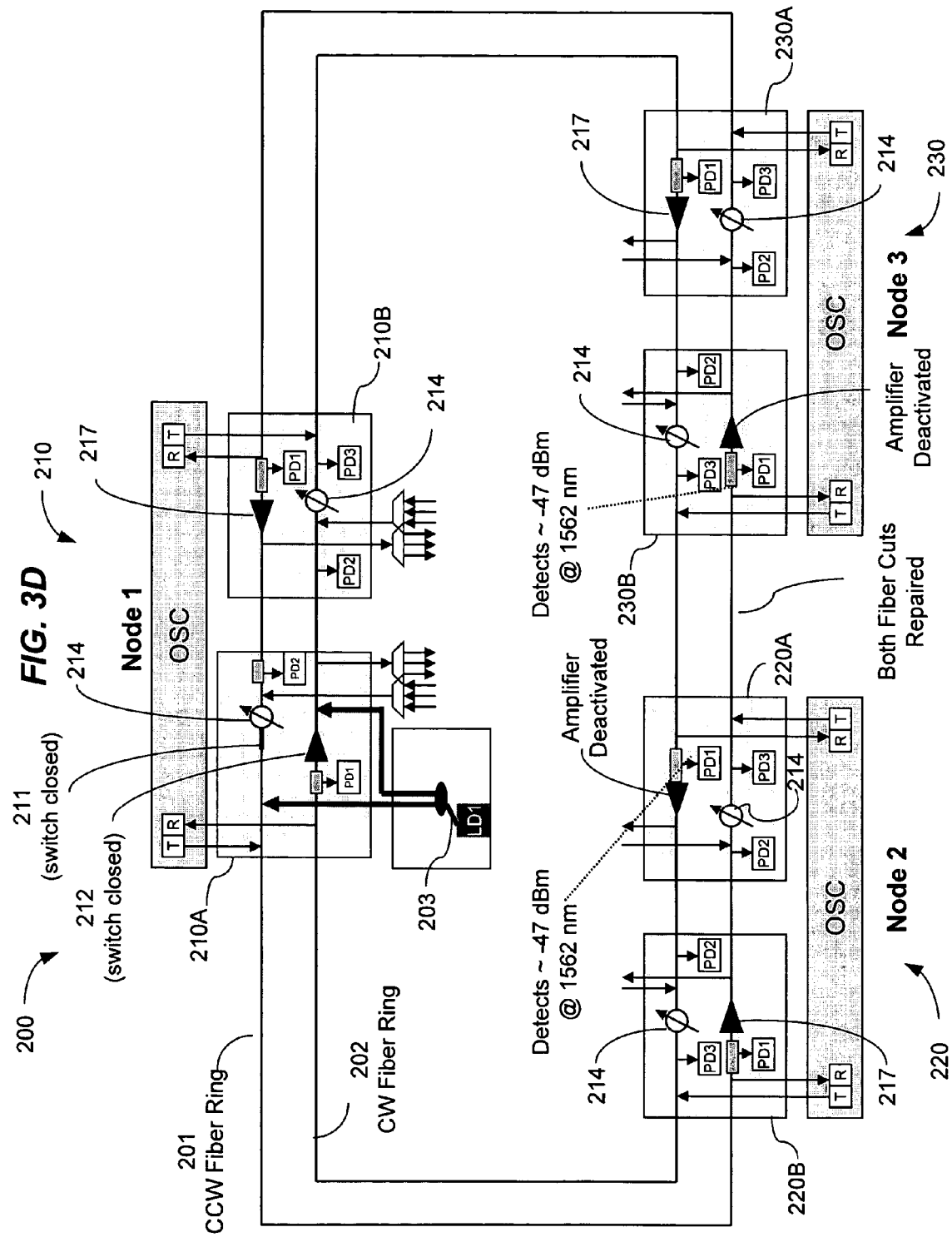

After the fiber cuts in both fiber rings 201 and 202 are repaired as shown in FIG. 3D, the nodes 220 and 230 inform the central node 210 of this status by communicating the detected results at the probe detectors PD1 in nodes 220 and 230 to the central node 210 via the OSC signaling. Based on this information, the central node 210 sends out commands to nodes 220 and 230 to turn on the amplifiers in nodes 220 and 230 to remove the protective break point in each direction. After the nodes 220 and 230 receive the commands and turn on their respective amplifiers, the entire fiber ring is a closed loop in each direction and hence the optical probe signal, which is launched in the central node 210, can now circulate back to the central node 210 in both directions. The central node 210 can detect the presence of the optical probe signal in both fiber rings 201 and 202 locally and this event triggers the central node 210 to open the gate switches 211 and 212 to restore the default break point in each fiber ring. At this time, the network 200 is reverted back to its normal operating state shown in FIG. 2.

The above protection switching provides an automatic reverted switching to the default protection switching state where a break point in each direction is maintained at the central node. Based on the location of the optical failure, the proactive break point or points can vary in location but after the optical failure is corrected, the break point in each direction is restored back to the central node.

Figure 4B:
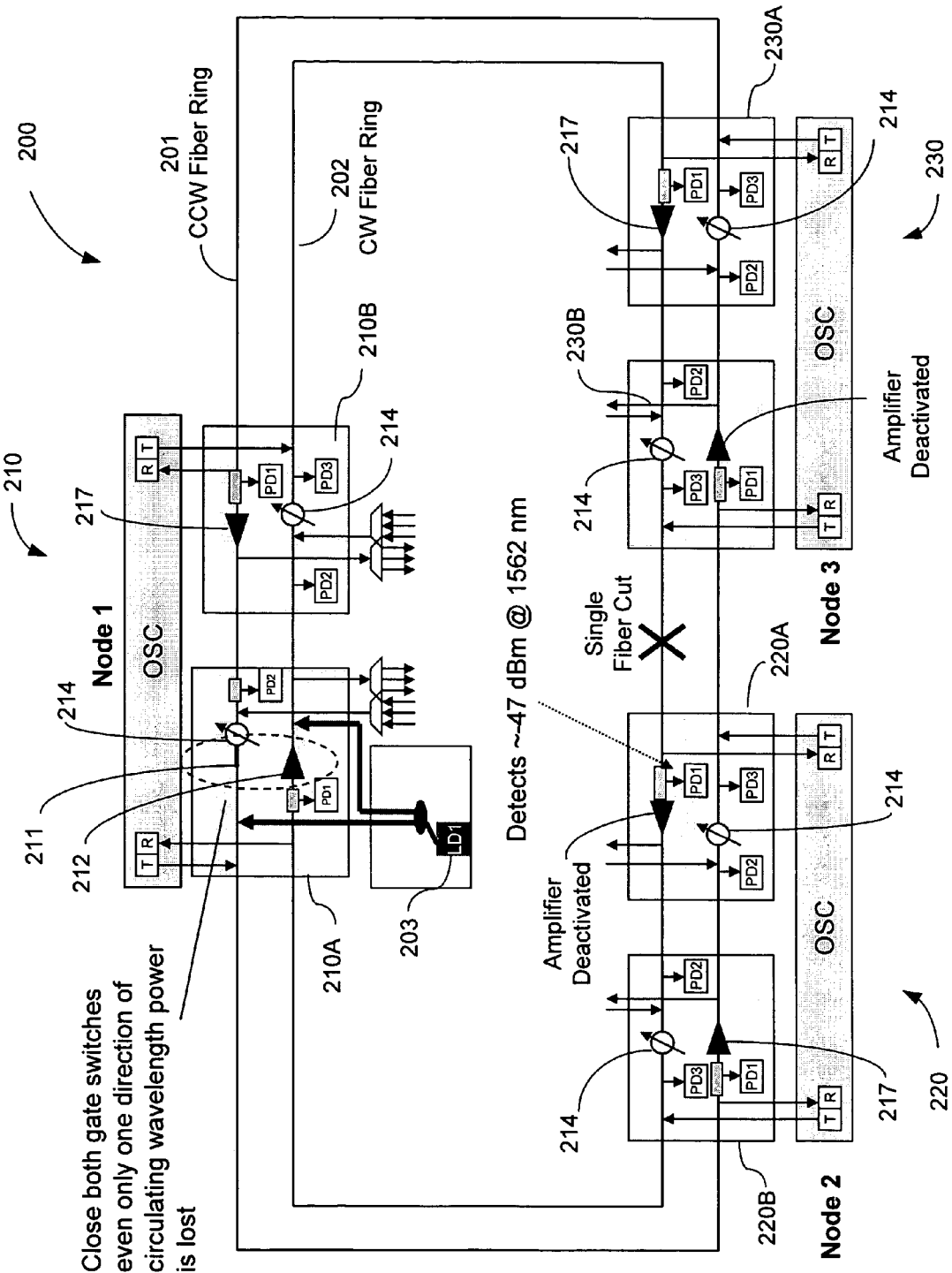
Figure 4C:
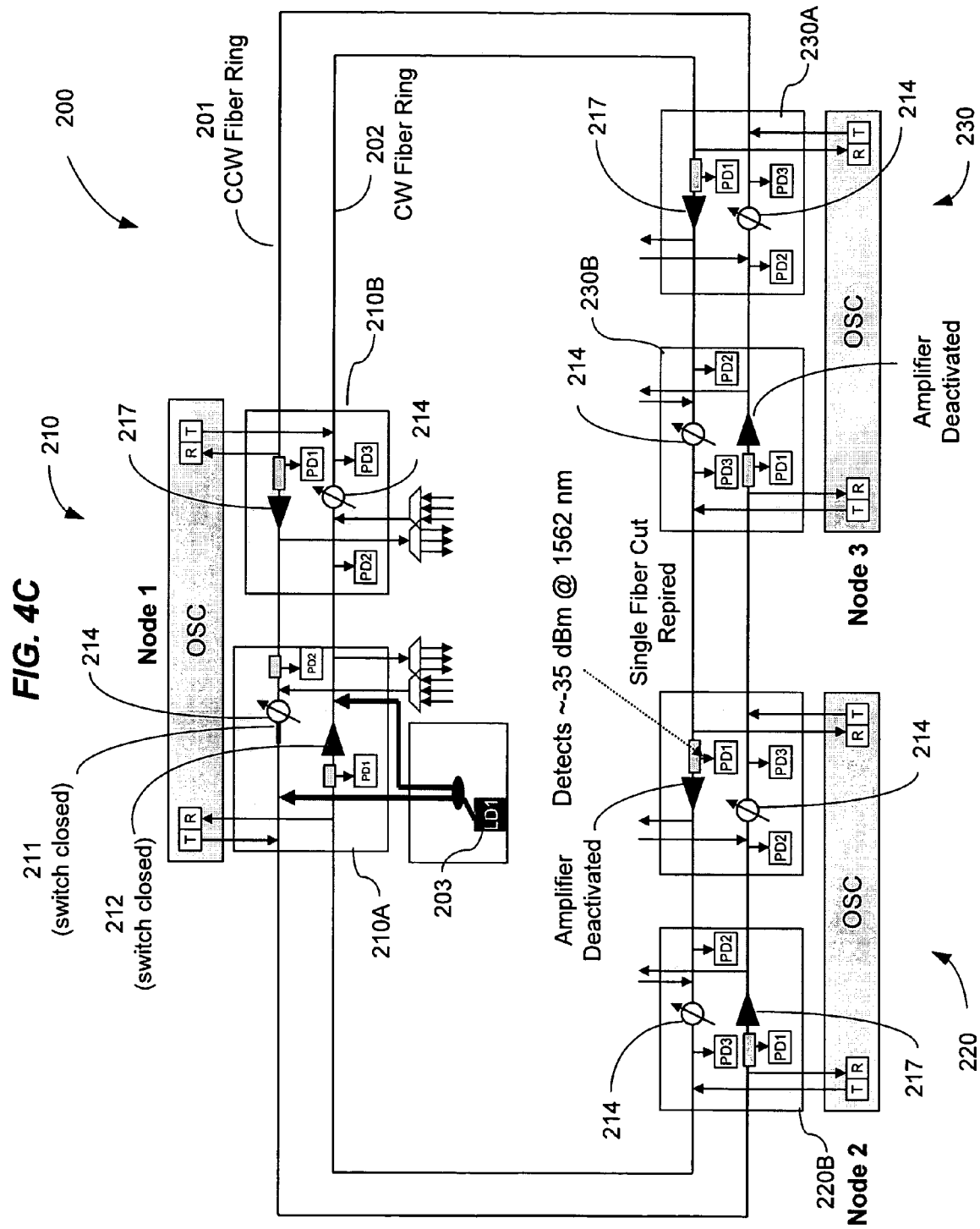

FIGS. 4A, 4B and 4C illustrate a part of the protection switching sequence in the network 200 in FIG. 2 when only one fiber ring 202 is cut between the nodes 220 and 230. The protection switching is the same by closing the default break point in-both fiber rings 201 and 202 and creating the protective break points in both fiber rings in nodes adjacent to the location of the fiber cut even though the other fiber ring 201 does not experience any optical failure.

The optical amplifier used as the gate switch 212 in the central node 210 and other optical amplifiers 217 in the nodes 220 and 230 need to have a fast response to switch between on and off due to the requirement of protection switching of at least 50 msec in current commercial networks. Such a high-speed switching optical amplifier may be replaced by a combination of a fast optical switch with an optical amplifier without the fast switching capability. In addition, a fast switching variable optical attenuator and an optical amplifier without the fast switching capability may also be used to replace each high-speed switching optical amplifier in FIG. 2.

The protection switching described above for a fiber cut between nodes can be similarly applied to protection switching for a device failure in a node by treating the device failure as a fiber cut in a nearest fiber span to the failed device. Referring to FIG. 2, the failure of the optical amplifier 217 in the line card 220A within the node 220 is treated as a fiber cut in the fiber ring 202 between the nodes 220 and 230 and thus the amplifier 217 in the fiber ring 201 in the opposite direction in the line card 230B of the nearest node 230 is shut down along with the gates switches 211 and 212 in the central node 210 in the protection switching. This switching can be triggered by the local detection by the detectors PD2 and PD3. The corresponding operating condition after this switching is identical to what is in FIG. 3B. As another example, the failure of the VOA 214 in the line card 220B within the node 220 is treated as a fiber cut in the fiber ring 202 between the nodes 220 and 210 and thus the amplifier 217 in the fiber ring 201 in the opposite direction in the nearest node 220 is shut down along with the gates switches 211 and 212 in the central node 210 in the protection switching. As yet another example, if the optical amplifier 217 in the line card 210B of the central node 210 fails, the amplifier 217 in the line card 230A of the reverse direction neighbor node 230, which is closest to the failed amplifier, is turned off.

Hence, for non-central nodes, after a fiber break or device failure, under the control of the central node 210, a switch (either an amplifier or a regular 1×1 switch) downstream from the fiber break or failed device is opened, the VOA in the reverse direction and in the same card is darkened so that the other switch in a downstream neighbor node in the reverse fiber direction and downstream from the fiber break or failed device is also opened. At the same time, the fiber break or device failure causes loss of the optical probe signal in at least one of the fibers in the central node 210 and this causes the central node 210 to close the gates switches 211 and 212.

In the centrally controlled ring network 200 in FIG. 2, the status reporting from a ring node to the central node 210 and the delivery of a command from the central node 210 to a ring node are based on the node-to-node optical communication using an out of band optical supervision channel. Alternatively, the circulating optical probe signal can be used and modulated to carry the data for the status reporting from each node to the central node and delivery of commands from the central node to each node for execution of the protection switching described above. This use of the circulating optical probe signal can eliminate the need for the OSC signaling in the protection switching. Accordingly, the detection of the optical probe signal can include processing of the modulated data in the optical probe signal beyond the simple detection of the power level of the circulating probe signal at the optical probe detector PD1.

In other implementations, the circulating optical probe signal can be modulated to carry other control and management data that may be communicated via OSC signaling. This use of the circulating optical probe signal can completely eliminate the need for the OSC signaling and OSC transmitters and receivers and other associated hardware in the ring network and thus can simplify the node structure, the ring structure, and the operations of the nodes and the ring. Various modulation techniques may be used in each node to modulate the optical probe signal. An optical modulator may be added in each node to modulate the optical probe signal. An existing VOA in a non-central node can also be used to modulate the probe signal by controlling the attenuation of the VOA to superimpose reporting data to the central node.

As an alternative to the above switching protection mechanisms based on centrally controlled ring networks, each regular node in a ring may be designed to control its local switching operations entirely based on local information within the node without the wait for a command from the central node 210. A hybrid mode protection switching can be provided to combine the central protection switching in the central node based on the circulating optical signal and local switching in each non-central node based on local information without the control from the central node.

In one implementation of this hybrid mode protection switching, the central node uses its local detection of the circulating optical probe signal to operate the local gate switches within the central node to open or close the default break point in each direction based on the detected status of the circulating optical probe signal in the central node. In this aspect, the hybrid mode is similar to the centralized mode in the network in FIG. 2. However, different from the centralized mode in FIG. 2, the central node in the hybrid mode no longer controls all other regular ring nodes for the protection switching. Instead, other regular ring nodes are self controlled and operate their respective local switching to generate a local protective break point based on a local detection of the light in the network without relying on information or commands from the central node. Notably, each non-central node does not report the local node condition to the central node in order to respond to a fiber break or device failure. Neither does each non-central node wait for a control command from the central node before taking any action in response to a fiber break or device failure. With the exception of a non-central node adjacent to the central node on the side of the central node with gate switches, this hybrid mode protection switching eliminates the communications between the central node and each non-central node via the OSC signaling in activating the protection switching by creating a local optical break point after occurrence of a fiber cut or device failure.

In a hybrid mode protection switching, the optical nodes in the ring are classified into three categories and are configured and operated differently: the central node, a special non-central node next to the central node on the side of the central node with gate switches, and other regular ring nodes. Different from the centralized mode, the circulating optical probe in each of the two counter propagating directions is monitored separately from other optical signals in the central node only and a regular node monitors the total optical power in each fiber ring. Like the central node in the centralized mode, the central node uses a optical coupler and a probe-wavelength filter, e.g., the design in FIG. 2A, to split a portion of the circulating optical probe signal in each of the two directions as a monitor signal. In its default state, the central node maintains a default break point in each of the two directions in the ring when the circulating optical probe signal is present in both directions of the ring. When the optical probe signal in either one of the two directions is not detected, the central node operates to close the default optical break point in each of the two directions and open the default optical break point when the optical probe signal in each of the two directions is detected. In a regular ring node that is not the central node, a total optical power of light received in the respective ring node is monitored, without monitoring the circulating optical probe signal separately, to determine whether the total optical power is below a power threshold associated with a fiber break. In implementations, this power threshold can be set at a low value so that the received total optical power at a node that is not immediately downstream from a fiber cut is above this power threshold due to light from an immediate upstream node such as one or more added WDM channels or the amplified spontaneous emission (ASE) from the upstream node. This design can be used to ensure that only non-central nodes next to a fiber cut are triggered to react to the fiber cut while other non-central nodes remain in their normal operation.

In one implementation, the special non-central node next to the side of the gate switches of the central node can operate differently from other regular ring nodes and rely on the OSC signaling with the central node to perform its location protective switching when the detected total optical power is below the power threshold. For Other regular ring nodes, each ring node creates a protective optical break point when the total optical power is below the power threshold. Hence activation of the protection switching can be achieved without relying on information or commands from the central node and any other ring nodes. The OSC signal, for example, is no longer needed for activation of the protection switching in these nodes. Hence, this hybrid control mode can reduce the need for node-to-node communications in protection switching and essentially eliminate the dependency of the response time for the protection switching on the number of nodes in the ring, and thus can provide a fast response time in protection switching.

Figure 5:
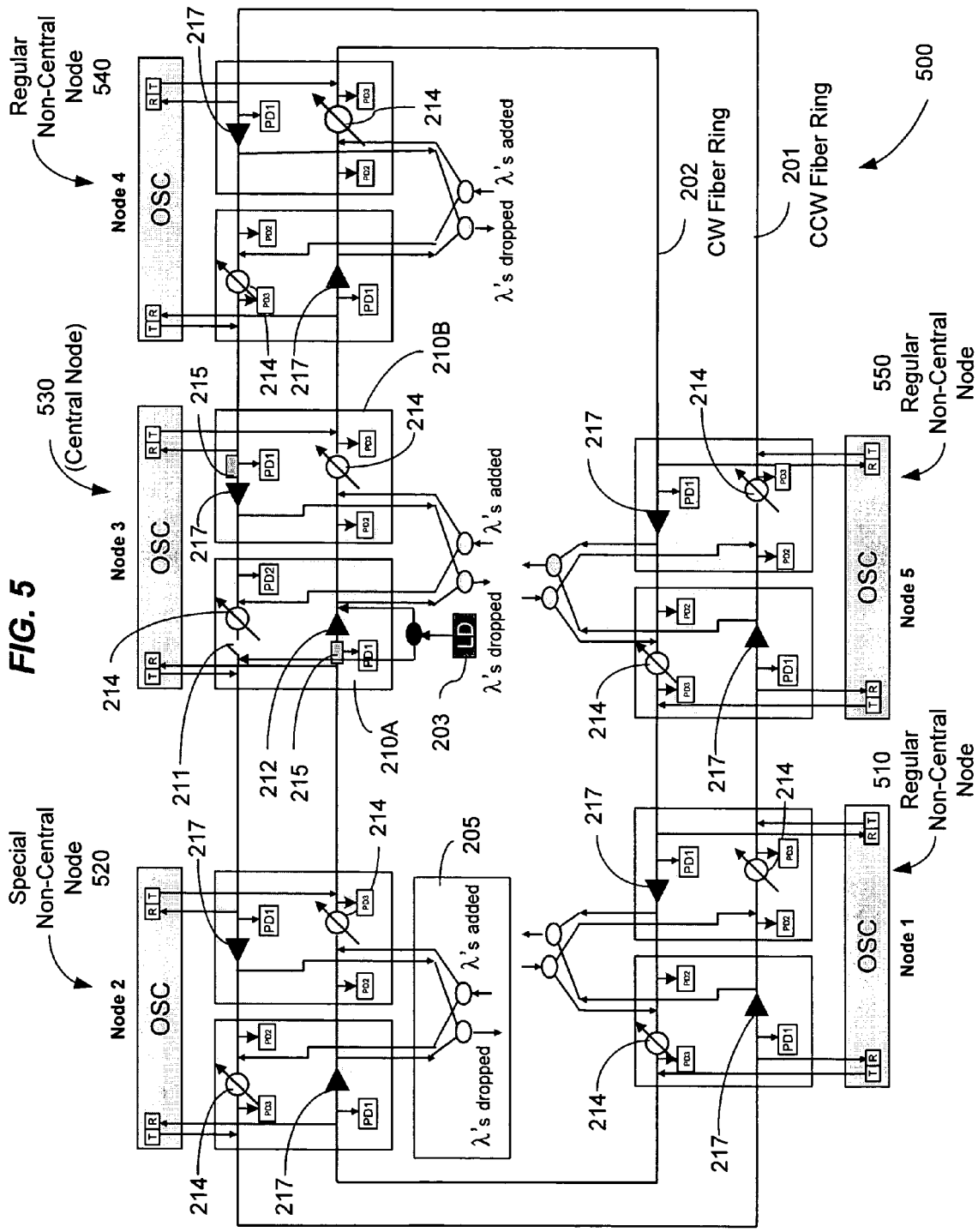
FIG. 5 shows an exemplary dual-fiber ring network having all optical ring nodes in a broadcast-and-select architecture that implements the circulating optical probe signal for protection switching in a hybrid control mode.

FIG. 5 shows one example of a dual-fiber ring network 500 in a hybrid control mode. Examples of the nodes shown are a central node 530 (node 3) and four non-central ring nodes 510 (node 1), 520 (node 2), 540 (node 4) and 550 (node 5). The central node 530 in FIG. 5 operates in a way similar to the operation of the central node in the centralized mode in FIG. 2: the central node 530 separately monitors the circulating optical probe signal and controls the gate switches 211 and 212 based on the status of the detected circulating optical probe signal.

The node 520 next to the central node 530 is a special node that is different from other non-central nodes because-it is located on the side of the gate switches 211 and 212 of the central node 530. Under the normal operating condition where there is no other fiber cut or node failure in the ring network 500, the gate switches 211 and 212 are open to create default breaks in the fiber rings 202 and 202. Other than the OSC and circulating optical probe signals, the WDM signals and ASE from the amplifier 217 in the fiber ring 201 are blocked by the default break of the gate switch 211. The total optical power received by the special node 520 in the fiber 201 may be below the power threshold under the normal operating condition. This relation makes the node 520 a special non-central node different from other non-central nodes 540, 550 and 510. To avoid shutting down the special node 520 under the normal operating condition, the special node 520 can be controlled to detect the fiber cut in the fiber span from the special node 520 to the central node 530 based on a node-to-node communication between the nodes 520 and 530 and to operate its protection switching based on the node-to-node communication. This node-to-node communication can be achieved by, e.g., the OSC signaling, modulation of the optical probe signals and others. When the circulating optical probe signal is modulated to carry network control and management data, the hardware for OSC signaling including OSC transmitters and receivers can be eliminated. Various modulation techniques may be used in each node to modulate the optical probe signal. An optical modulator may be added in each node to modulate the optical probe signal. An existing VOA in a-non-central node can also be used to modulate the probe signal by controlling the attenuation of the VOA to superimpose reporting data to the central node. In the following examples, the node-to-node communications used in the hybrid protection switching is the OSC signaling and the same process in these examples can be applied to node-to-node communications based on modulated optical probe signals. Whenever there is a loss of the OSC signaling between the special node 520 and the central node 530 in at least one of the fiber rings 201 and 202, the special node 520 opens up the two switches (i.e., optical amplifiers 217) in the fiber rings 201 and 202 to block optical transmission through the special node 520.

Other non-central regular nodes 540, 510 and 550 are operated entirely based on their local detection of the total optical power without relying on communications with the central node 530 and other nodes.

Some aspects of the nodes in FIG. 5 are similar to the ring network 200 in FIG. 2 while other aspects are different. Similar to the nodes in FIG. 2, each node in FIG. 5 can be implemented with two amplifier line cards and can use the optical amplifiers as optical switches to create optical breaks when the protection switching is activated. A node may also replace the amplifiers by 1×1 optical switches when the optical gain in that node is not needed when, e.g., the node is connected in a short fiber span between two other nodes with amplifiers. The central node 530 in the example shown in FIG. 5 has two gate switches 211 and 212 in the line card 210A that interfaces with the non-central node 520 (node 2). The features in the central node 530 for coupling the optical probe signals in both fiber rings 201 and 202 and the local detection of the optical probe signals are similar to the central node 210 in FIG. 2. For example, a wavelength-selective coupler 215 is used in the central node 530 to selectively drop a fraction of the optical probe signal while transmitting light at the WDM signal wavelengths so that each probe detector PD 1 coupled to the coupler 215 is designated to measure only the optical probe signal. Based on the local status of the optical probe signals in both fiber rings 201 and 202, the central node 530 operates the gate switches 211 and 212 to open or close default optical break points in the fiber rings 201 and 202.

For the regular ring nodes 540, 550 and 510, each wavelength-selective coupler 215 in the ring node in FIG. 2 that is placed at the entrance of each ring node in each fiber ring to selectively split a portion of the circulating optical probe signal is now replaced by a broadband coupler that splits a fraction of all optical signals in each fiber ring to the detectors PD1 and the split light by the broadband coupler includes the optical WDM signals, the circulating optical probe signal and ASE. Hence, in the ring network 500 in FIG. 5, each detector PD1 measures the total optical power in each fiber ring received by the ring node and the location of the broadband coupler is upstream from the coupler that adds one or more WDM add signals. A predetermined power threshold power level is used by each ring node to determine whether there is an optical break point at a location upstream from the ring node. If the detected optical power is below the threshold power level in a first fiber ring, the ring node reacts to shut off its optical transmission in the first fiber ring and the optical transmission in the other, the second fiber ring. This action triggers the downstream node in the second fiber ring, which is the upstream node in the first fiber ring, to turn off its transmission in both the first and the second fiber rings in the same manner. When the measured optical power at each detector PD1 is no longer below the power threshold, the optical transmission in each ring node resumes under the control by the central node 530.

Each regular ring node in FIG. 5, similar to a regular ring node in FIG. 2, has a VOA 214 downstream from the optical amplifier 217 and the detector PD1 in each fiber ring. Different from the regular ring in FIG. 2, each regular ring node in FIG. 5 further uses each VOA 214 as an optical switch in the optical protection switching. In each regular ring node in FIG. 5 (e.g., the node 510), when the optical detector PD1 in a first-fiber ring (e.g., the ring 202) detects a loss of light, the corresponding switch immediately downstream from the detector PD1 in the first fiber ring 202, e.g., optical amplifier switch 217, is turned off to block optical transmission while the ring node 510 opens up a corresponding switch (VOA 214) in the second fiber ring 201 within the same node to turn off its optical transmission at the output of the same node in the second fiber ring 201. This action shuts down optical transmission in both fiber rings 201 and 202 through the node 510. This action further triggers an immediate downstream node 550 in the second fiber ring 201, which is the immediate upstream node in the first fiber ring 202 on the other side of the fiber break, to detect the loss of the optical power in the second fiber ring 201 and thus opens up its local optical switches, i.e., the optical amplifier 217 in the second fiber ring 201 and the VOA 214 in the first fiber ring 202. Next, the upstream VOAs 217 respectively in the two nodes 510 and 550 in the two fiber rings 201 and 202 are controlled to restore their normal optically transmissive operating mode to allow optical transmission while the two turned-off downstream optical amplifiers 217 respectively in the nodes 510 and 520 in the in the two fiber rings 201 and 202 remain turned off to block optical transmission. Under this condition, when the fiber repair is detected via the photo-detector PD1 in nodes 510 and 550 near the fiber break and the nodes 510 and 550 can be automatically restored to their normal operations after the repair is completed based on such optical detection downstream from the fiber break. The above local protection switching without communication with the central node 530 can be used to respond to a fiber cut either in only one of the two fiber rings 201 and 202 between the nodes 510 and 550 or in each of the two fiber rings 201 and 202 between the nodes 510 and 550.

FIGS. 6A, 6B, 6C and 6D illustrate an exemplary protection switching sequence in the ring network 500 in FIG. 5 when both fiber rings 201 and 202 are cut at a location between regular ring nodes 510 and 550. Under a normal condition, the gate switches 211 and 212 in the central node 530 are open to create the default optical break point in both fiber rings 201 and 202 and all other ring nodes transmit light.

Figure 6A:
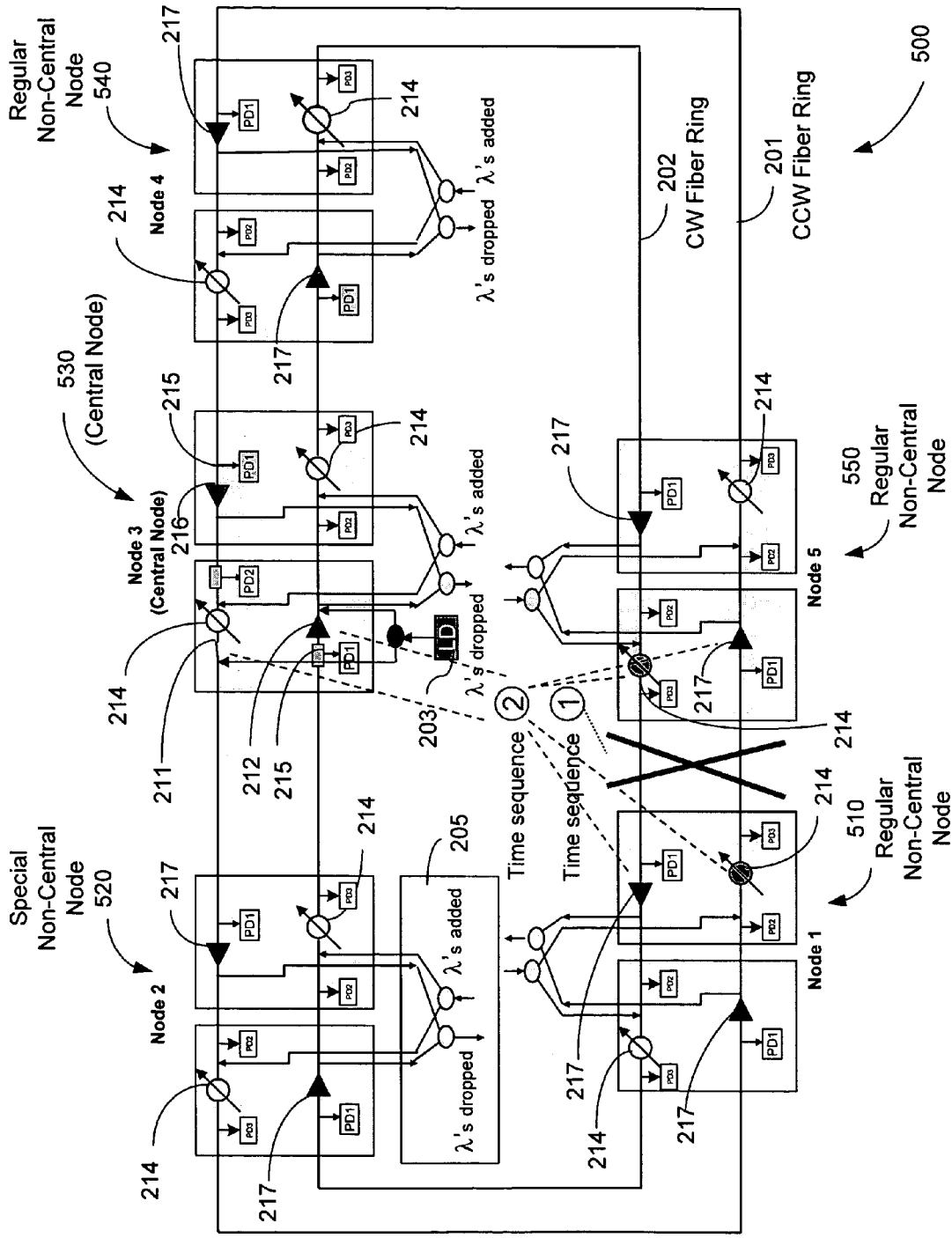
FIGS. 6A, 6B, 6C and 6D show an example operation sequence in a hybrid mode of the ring network in FIG. 5 when both fiber rings are cut at a location.
Figure 6B:
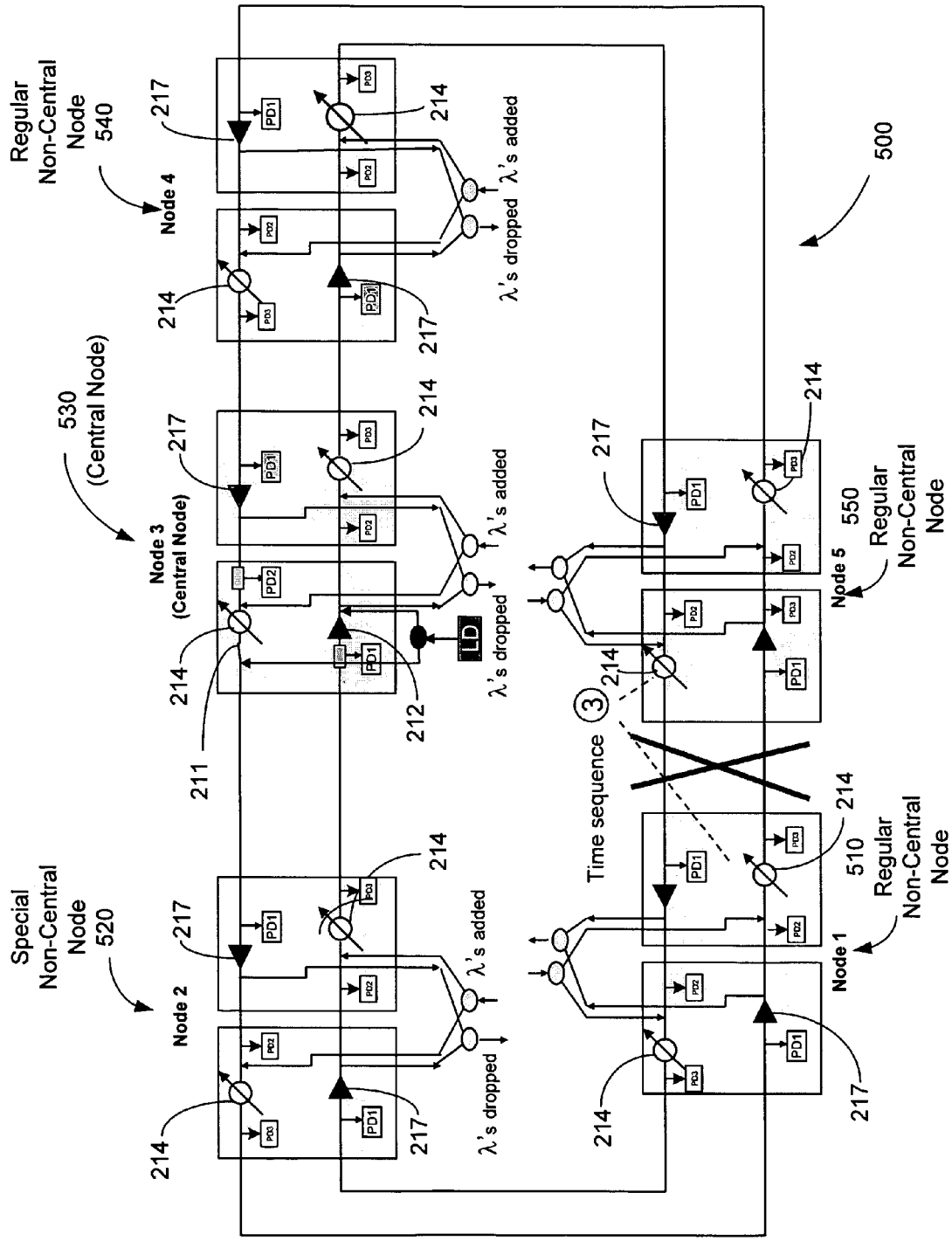

When the fiber cut occurs in both fiber rings 201 and 202 between nodes 510 and 550, the detector PD1 in the node 510 downstream from the location of the fiber cut in the fiber ring 202 and the other detector PD1 in the node 550 downstream from the location of the fiber cut in the fiber ring 201 detect the loss of optical power. In each of the nodes 510 and 550, the VOA 214 upstream from the fiber cut in one fiber ring and the optical amplifier 217 downstream from the fiber cut are operated to block optical transmission. At the same time, the central node 530 detects loss of the optical probe signal in both fiber rings 201 and 202 after the fiber cut occurs and thus closes the gate switches 211 and 212 to allow optical transmission through the central node 530 to re-route the optical traffic blocked by the fiber cut between the nodes 510 and 550. Other nodes, such as nodes 520 and 540, do not detect any abnormal conditions based on the received total optical power in each fiber ring and remain in their normal operation to continue to transmit light in both directions. This is shown in FIG. 6A. The node 520, for example, is not next to the fiber cut between the nodes 510 and 550 and receives the optical power from the added WDM signals from an upstream node, e.g., the central node 530 as an upstream node and other upstream nodes 540 and 550 in fiber ring 201, and the node 510 as an upstream node in the fiber ring 202. In addition, the node 520 could also receive optical power from amplifier ASE noise from each upstream node that is not shut down, e.g., there may be a booster optical amplifier present at the exit of the node 510 in fiber 202. The threshold power in each node can be set at a level to be less than the total optical power of the ASE noise and added WDM signals from an upstream node to ensure only the two nodes next to the fiber cut activate their local protection switching when the fiber cut occurs.

The blocking of optical transmission in the VOAs 214 in the nodes 510 and 550 shown in FIG. 6A prevents each local detector PD1 downstream from the fiber cut to monitor whether optical transmission is restored in each fiber ring between the nodes 510 and 550. Next shown in FIG. 6B, after the above switching operations in the nodes 510, 550 and 530 are completed, the node 510 turns the VOA 214 in the other fiber ring 201 back to its normal attenuation value to allow for optical transmission. The node 550 performs the same switching operations as in the node 510 and turns the VOA 214 in the fiber ring 202 back to its normal attenuation value to allow for optical transmission. At this time, the detector PD1 in the node 510 in the fiber ring 202 monitors the optical transmission from the node 550 and the detector PD1 in the node 550 in the fiber ring 201 monitors the optical transmission from the node 510. In addition, the central node 530 continues to detect the loss of the optical probe signal in both fiber rings 201 and 202 and thus the gate switches 211 and 212 remain closed to allow for optical transmission through the central node 530.

Figure 6C:
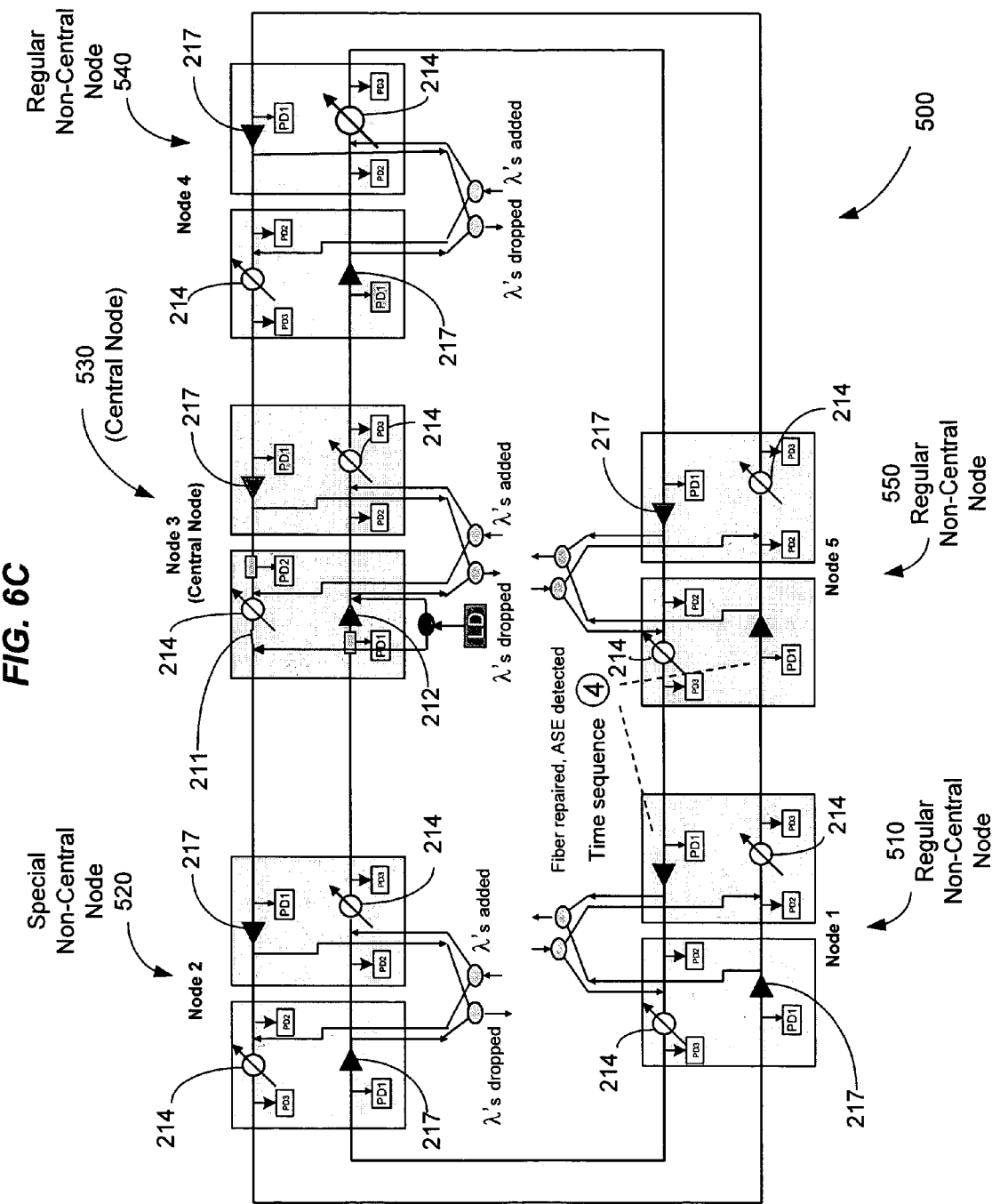

After the fiber cut is repaired and optical transmission in both fiber rings between the nodes 510 and 550 is restored, the detector PD1 in the node 510 in the fiber ring 202 detects light received from the node 550 and the detector PD1 in the node 550 in the fiber ring 201 detects light received from the node 510. This is shown in FIG. 6C. In response, the nodes 510 and 550 close their local switches by turning on the optical amplifier 217 in the node 510 in the fiber ring 202 and the amplifier 217 in the node 550 in the fiber ring 201 to return to their normal operation.

Figure 6D:
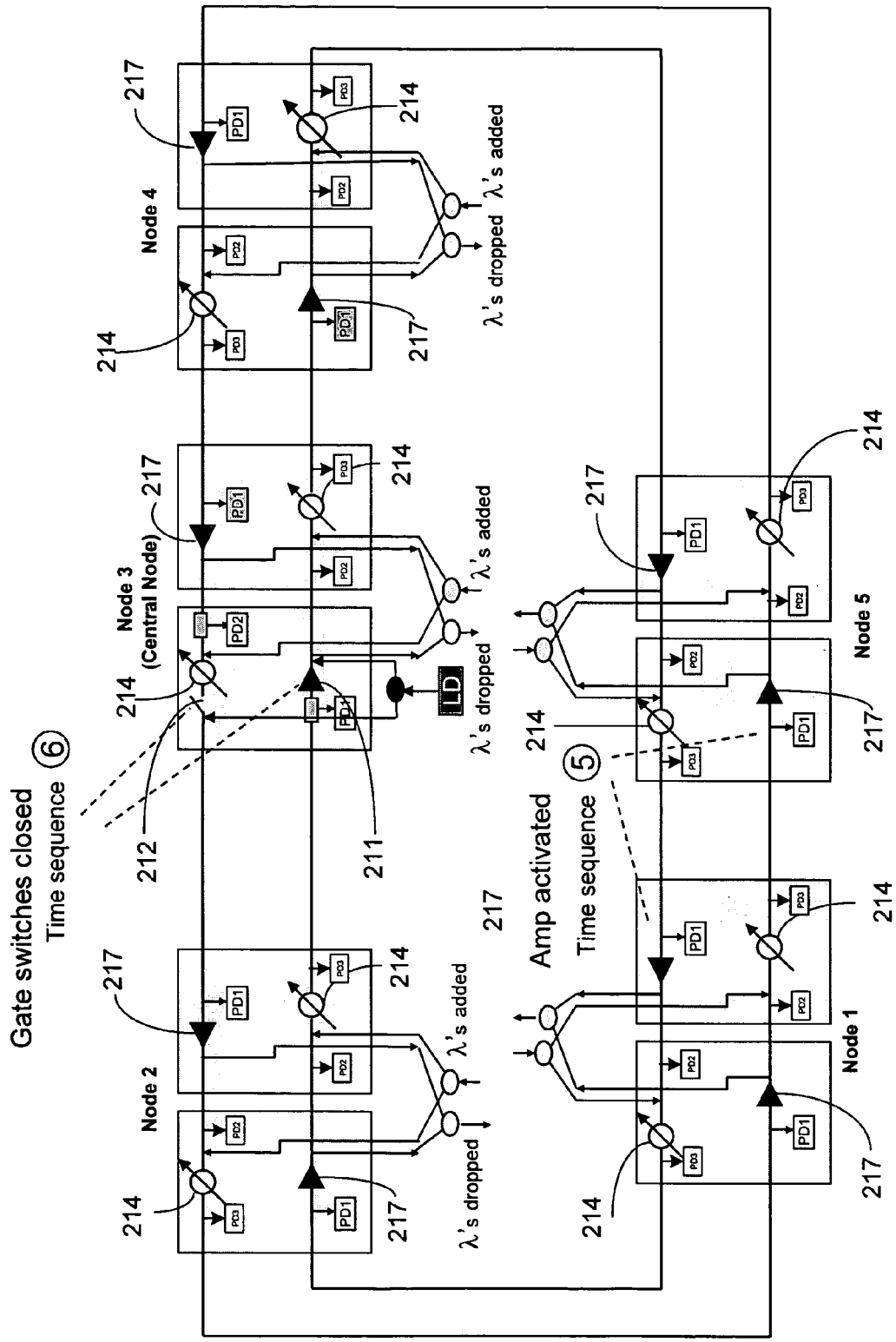

After the above operations of the nodes 510 and 550, the circulating optical probe signals in both fiber rings 201 and 202 resume circulation in the fiber rings 201 and 202 through the nodes 510 and 550 so that the probe detectors PD1 in the central node 530 detect the reappearance of the optical probe signals. The central node 530 responds to this condition by opening up the gate switches 211 and 212 to restore the default break points in the fiber rings 201 and 202, respectively. This is shown in FIG. 6D. At this time, the ring network 500 returns to its normal operation shown in FIG. 5.

In the above operations of the protection switching in the hybrid mode, the optical amplifiers 217 in nodes 510 and 550 may turn on at different times when each node operates entirely based on its local detection of the total received optical power. This can occur, for example, when the fiber cuts in the two fiber rings at the same location are repaired at different times. When the optical amplifiers 217 in nodes 510 and 550 near the fiber break turn on at different times, the circulating optical probe signals in the two fiber rings 201 and 202 resume circulation in the two fiber rings 201 and 202 at different times. The gate switches in the central node 530 can be operated to open at different times where each gate switch in one fiber ring is closed as soon as the probe detector PD1 in the central node 530 in that fiber ring detects the optical probe signal in order to avoid formation of a closed optical loop in each fiber ring.

In deployment of many ring networks, it is often undesirable to turn on the shut-down optical amplifiers 217 in nodes 510 and 550 at different times in protection switching. TO address this technical issue, a central control mechanism can be used to synchronize the operations of turning on the shut-down optical amplifiers 217 in nodes 510 and 550 during the protection switching. This can be achieved by, e.g., using the node-to-node OSC signaling or other management network signaling to turn on the shut-down amplifiers 217 at the same time like in the centralized protection switching described by the example in FIGS. 6A-6D. Therefore, after the amplifiers 217 in the nodes 510 and 550 are shut down, the operation of turning on the amplifier is controlled by the central node 530.

First, after the fiber cut occurs, the detected signals by the local detectors PD1 in the two neighbor nodes 510 and 550 next to the fiber cut can indicate which of the two fibers has the fiber cut and whether a single fiber or the two fibers experience a fiber cut. After the fiber cut, the central node 530 opens up the two gate switches and the nodes 510 and 550 shut down their local amplifiers 217 next to the fiber cut as described above and illustrated in FIG. 6B. The two nodes 510 and 550 use the node-to-node signaling to inform the central node 530 of the status of the fiber cut condition. Next, the fiber cut is repaired and the downstream optical detector PD1 can detect the optical transmission through the repaired fiber span and this information is communicated to the central node 530 via the node-to-node communications such as OSC signaling. After the central node 530 is informed of that the single fiber cut in one of the two fibers or the fiber cuts in both fibers are repaired, the central node 530 sends out a command to each of the two nodes 510 and 550 via the node-to-node communication to turn on the shut-down optical amplifiers 217 in the nodes 510 and 550. Upon turning the amplifiers 217, the optical probe signal reappears in both fiber rings in the central node 530 and, in response, the central node 530 opens up the two gate switches 211 and 212 to restore the default break points. At this time, the ring network automatically restores its normal operation.

When a fiber cut occurs in only one fiber ring in the network 500 in FIG. 5, the same protection switching sequence shown in FIGS. 6A-6D can be applied. Assuming the single fiber cut is in the fiber ring 202 between the nodes 510 and 550, the fiber cut would first cause the node 510 to shut down the optical transmission through the optical amplifier 217 in the fiber ring 202 and the VOA 214 in the fiber ring 201. Unless the VOA 214 in the fiber ring 201 in the node 510 shuts down, the node 550 would not detect the fiber cut and would continue its normal operations. Once the VOA 214 in the fiber ring 201 in the node 510 shuts down, the optical detector PD1 in the node 550 downstream from the node 510 in the fiber ring 201 detects the loss of the optical power and the node 550 shuts down the optical transmission of the optical amplifier 217 in the fiber ring 201 and the VOA 214 in the fiber ring 202 within the node 550. The rest of the operations for the protective switching can be implemented based on the above hybrid mode protection switching for the fiber cuts in both fibers.

The special node 520 next to the central node 530 in FIG. 5 on the side of gate switches 211 and 212 does not receive WDM optical signals from the central node and thus can use a node-to-node signaling with the central node 530 to determine whether there is a fiber break between the node 520 and the central node 530 in the hybrid mode protection switching. In one implementation, this node-to-node signaling can be the OSC signaling as shown in the examples in FIGS. 7 and 8.

Figure 7:
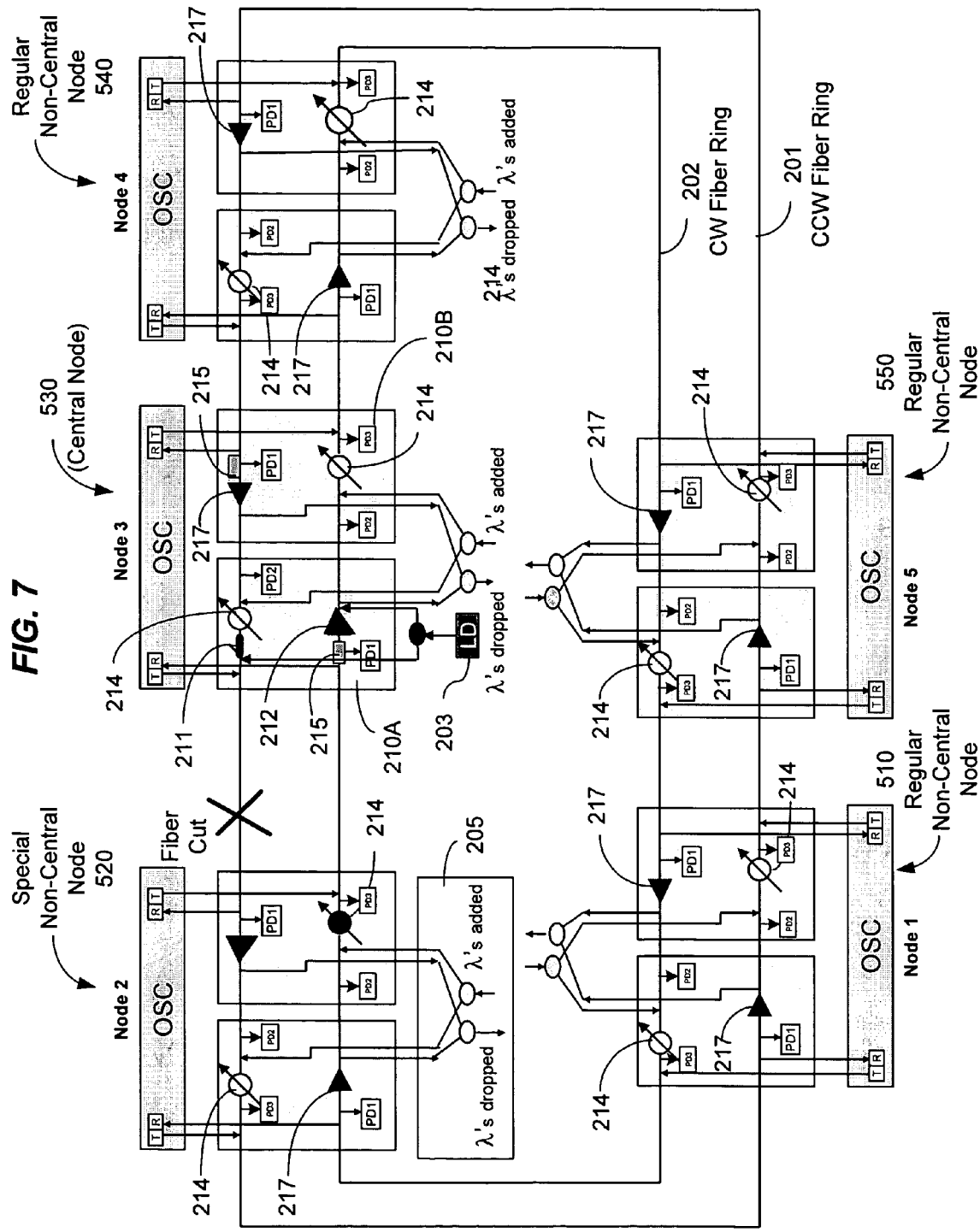
FIGS. 7 and 8 show operations of a special non-central node next to the side of the central node with gate switches in the hybrid control mode in the ring network shown in FIG. 5.
Figure 8:
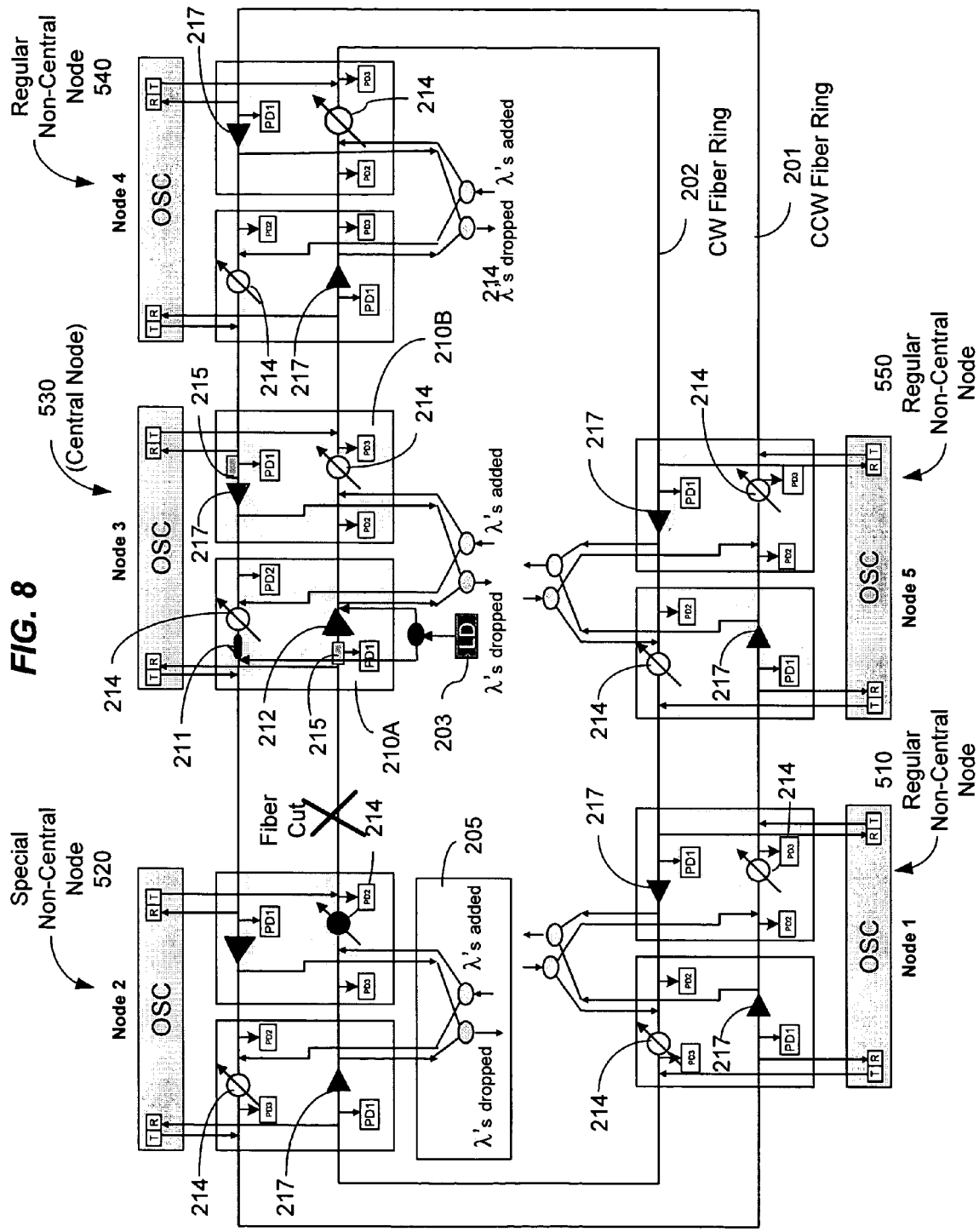

FIGS. 7 and 8 illustrate operations of the special node 520 based on OSC signaling between the special node 520 and the central node 530 in FIG. 5 according to one implementation. FIG. 7 shows a situation where a fiber cut occurs in the fiber 201 between the nodes 520 and 530. The probe detector in fiber 201 within the central node 530 detects the loss of the circulating probe signal after the fiber cut occurs while the circulating probe signal in the other fiber ring 202 remains unaffected. In response to this detected loss of the optical probe signal, the central node 530 closes both gates switches 211 and 212 in the fiber rings 201 and 202 to allow transmission through the central node 530 in both fiber rings 201 and 202. At the same time, the OSC signal from the central node 530 to the special node 520 is detected by the special node 520 as being missing. This OSC detection causes the special node 520 to open local switches, VOA 214 and optical amplifier 217 close to the fiber cut, in both fiber rings 201 and 202 in the special-node 520, to block optical transmission through the special node 520.

After the fiber cut in the fiber ring 201 is repaired, the special node 520 detects the OSC signal from the central node 530 again. The central node 530 can also inform the special node 520 through the OSC signaling from the central node 530 that the fiber span on fiber 202 and between the central and special node is normal without a fiber break. In response to the presence of the OSC signal from the central node 530, the special node 520 closes both switches VOA 214 and the amplifier 217 in both fibers 201 and 202 close to the central node 530 to allow optical transmission through the special node 520 in both fiber rings 201 and 202. When this occurs, the central node 530 detects the circulating optical probe signal in both fiber rings 201 and 202 and thus opens up the gate switches 211 and 212 to restore the default break points in the fiber rings 201 and 202 to block optical transmission through the central node 530. This restore the normal operating condition of the network 500 as shown in FIG. 5.

FIG. 8 further shows a network condition where a fiber cut occurs in the fiber ring 202 between the special node 520 and the central node 530. The central node 530 detects (1) the loss of the OSC signal from the special node 530 and (2) the loss of the optical probe signal in the fiber ring 202. The OSC signal from the central node 530 to the special node 520 in the fiber ring 201 is not affected by the fiber cut. In response to the detected loss of the optical probe signal in the fiber 202, the central node 530 closes gate switches 211 and 212 to allow optical transmission through the central node 530. The central node 530 also informs the special node 520 via the OSC signal in the fiber ring 201 of the loss of the OSC signaling in the fiber ring 202. The special node 520 responds to this loss of the OSC signaling in the fiber ring 202 by opening up both switches, the optical amplifier 217 and the VOA 214 in the fiber rings 201 and 202 to block optical transmission through the special node 520. The VOA 214 in the special node 520 can be replaced by a 1×1 optical switch. After the fiber cut in the fiber ring 202 is repaired, the system restores back to its default status as shown in FIG. 5.

When fiber is cut in both fiber rings 201 and 202 between the special node 520 and the central node 530, both nodes 520 and 530 detect loss of OSC signaling. The central node 530 also loses the optical probe signal in the fiber 202. This condition triggers the central node 530 to close both gate switches 211 and 212 to allow for optical transmission through the central node 530. The loss of the OSC signaling from the central node 530 at the special node 520 causes the special node 520 to open up both switches, the optical amplifier 217 and the VOA 214 in the fiber rings 201 and 202, to block optical transmission through the special node 520. When fibers are repaired, the special node 520 and the central node 530 can communicate via the OSC signaling and the special node 520 receives notification in the OSC signaling from the central node 530 that both fibers 201 and 202 are repaired and the special node 520 subsequently closes its two switches. This permits the optical probe signal to pass through the special node 520 to reach the central node 530 in both fiber rings 201 and 202. In response to this reappearance of the optical probe signals in both fiber rings 201 and 202, the central node 530 opens the gate switches 211 and 212 to restore the default break points. At this time, the ring network returns to its normal operation as shown in FIG. 5.

The above hybrid mode protection switching for a fiber cut between nodes can be similarly applied to protection switching for a device failure in a node by treating the device failure as a fiber cut in a nearest fiber span to the failed device. Referring to FIG. 5, the failure of the optical amplifier 217 in the fiber ring 202 within the node 510 is treated as a fiber cut in the fiber ring 202 between the nodes 510 and 550 and thus the amplifier 217 in the fiber ring 201 in the opposite direction in the fiber ring 201 of the nearest node 550 is shut down along with the gates switches 211 and 212 in the central node 530 in the protection switching. This switching can be triggered by the local detection by the detectors PD2 and PD3 in the same node 510. This can cause local activation of the protection switching without the control by the central node 530. The operating condition caused by the switching is identical to what is in FIG. 6B. As another example, the failure of the VOA 214 in the fiber ring 202 within the node 510 can be detected by the detectors PD1, PD2 and PD3 in the downstream node 520 and is treated as a fiber cut in the fiber ring 202 between the nodes 510 and 520 and thus the amplifier 217 in the fiber ring 201 in the opposite direction in the nearest node 510 is shut down along with the gates switches 211 and 212 in the central node 530 in the protection switching.

The above hybrid protection switching uses local detection in each node to activate local protection switching in each node affected by a fiber cut or device failure without relying on control by the central node 530. The central node 530 closes up the gate switches 211 and 212 to close the default optical break points in the fiber rings 201 and 202 based on the locally detected loss of the optical probe signal in at least one fiber ring and does so without relying on communication from other nodes. The two neighboring nodes closest to the fiber cut or failed device also activates their protection switching entirely based on the locally detected loss of the total optical power in one of the nodes without relying on commands from the central node 530 and communication from other nodes. Therefore, the node-to-node communication process and the command from the central node 530 in the centralized protection switching can be eliminated in the activation of the hybrid protection switching. In this regard, the hybrid protection switching is faster than the centralized protection switching. The second phase of restoring the network back to its normal operation after the fiber cut or device failure is corrected in the hybrid protection switching, however, is similar to the centralized protection switching and uses node-to-node communication and commands from the central node 530 to synchronize the timing of the automatic reversion in both fiber rings 201 and 202.

In some optical ring networks, a particular optical signal carried by an optical WDM signal is directed to a particular node in the ring and is not intended for other nodes. In such a situation, after the particular node receives and drops the particular optical signal, the optical WDM signal that carries the dropped particular optical signal may no longer be used by other nodes in a broadcast and select network and cannot be reused to carry a different optical signal. This is because of the nature of a broadcast and select network. The drop coupler in a node splits a portion of all optical signals in the fiber line and the dropped light is filtered to select one or more signals for that node while optical power of the dropped one or more signals still remains in the fiber line and propagates along with other signals to broadcast to other nodes. Hence, an added signal via the same node must have a wavelength different from the dropped signals and other signals already in the fiber line. After a signal at a designated WDM wavelength is dropped at a node and the signal is not used by other nodes, the designated WDM wavelength is wasted.

One way to reuse this wasted optical WDM wavelength is to implement a wavelength blocker in each node to selectively block such an optical WDM signal while allowing other WDM signals to transmit so that the correspond WDM wavelength can be reused again. In the above dual-fiber ring networks in the centralized and hybrid control modes, each node can be configured to place the drop optical coupler upstream to the add optical coupler in each fiber so that a wavelength blocker can be inserted in each fiber ring downstream from the drop optical coupler and upstream from the add coupler.

Figure 9:
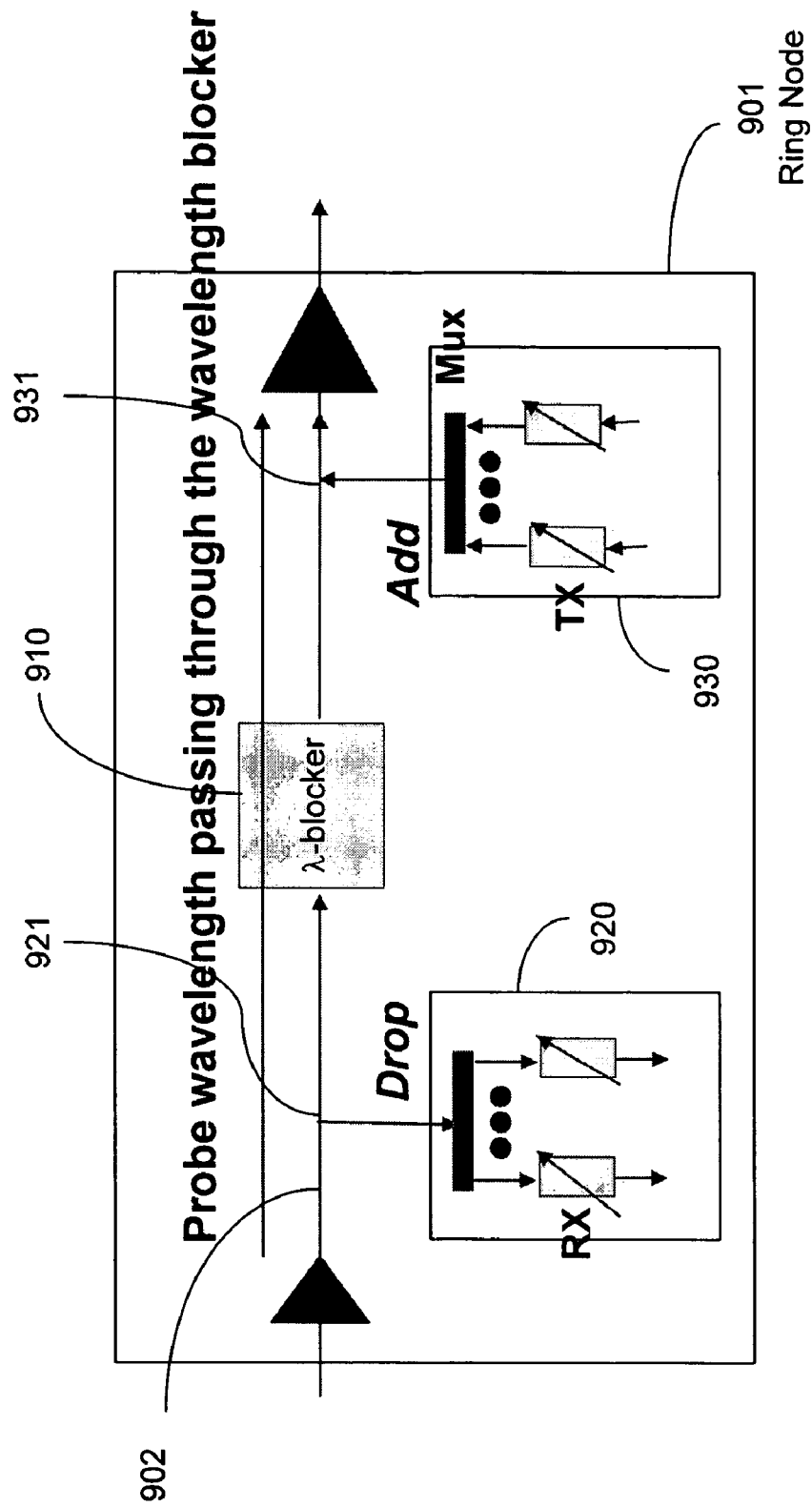
FIG. 9 shows one implementation of a node having a wavelength blocker to allow for reuse of a dropped WDM wavelength.

FIG. 9 shows an example of a portion of a ring node associated with adding and dropping WDM signals in one fiber. For a node in a dual-fiber ring network in FIG. 2 or 5, a similar mechanism can be duplicated for the other fiber. As illustrated, the ring node 901 includes a drop optical coupler 921 coupled to fiber 902 carrying optical traffic going from the left to the right hand. The drop optical coupler 921 is a broadband optical coupler that splits a portion of optical power at all optical WDM signals while allowing the remainder of all optical WDM signal wavelengths to continue on in the fiber 902. An add coupler 931 is coupled to the fiber 902 at a location downstream from the drop coupler 921 to add one or more optical WDM signals to the fiber 902 for communications to other downstream ring nodes. A node receiver 920 is connected to the drop coupler 921 to receive all WDM signals and selects one or more WDM signals as dropped signals to extract information. One or more fixed optical bandpass filters or tunable optical bandpass filers may be used for selecting the one or more dropped WDM optical signals. A node transmitter 930 is connected to the add coupler 931 to include one or more fixed or tunable optical transmitters to generate the added WDM optical signals.

The node transmitter 930 in the node 901 in FIG. 9 can be implemented by a tunable transmitter in a network to achieve certain advantages. Consider an example where a network is updated by inserting a wavelength blocker between the drop and add couplers in a node which has a node transmitter 930 at a WDM add wavelength different from a dropped WDM wavelength. If the node transmitter 930 in this node is tunable, the transmitter wavelength produced by the tunable node transmitter 930 can be immediately tuned to the dropped wavelength to re-use the dropped wavelength for transmitting a new signal channel. If a fixed wavelength transmitter were used as the node transmitters 930, this fixed node transmitter needs to be removed and replaced by a transmitter at the dropped wavelength after a wavelength blocker is inserted. Using a tunable node transmitter can avoid the labor and cost associated with the replacement A wave blocker 910 is coupled in the fiber 902 between the drop coupler 921 and the add coupler 931 to select at least one WDM wavelength to filter out light at the selected one WDM wavelength while transmitting other WDM channels including the circulating optical probe signal. Accordingly, the node transmitter 930 can generate a new WDM signal at the selected WDM wavelength to the fiber 902. In this context, the selected WDM wavelength that is filtered out and blocked by the wave blocker 910 can be reused by the ring network.

In the above fiber ring networks using a circulating optical probe signal, other fiber ring networks without the circulating optical probe signal and fiber networks in other network configurations, an optical switch may fail to open or close an optical break point. Such a switch failure may affect operations of a portion or the entirety of a network depending on the location of the failed switch. In the fiber ring networks described in this application, the failure of one gate switch 211 or 212 in the central node 210 in FIG. 2 or 530 in FIG. 5 may lead to failure of the protection switching for the entire network. Therefore, a redundant switch design may be desirable in implementing certain optical switches to reduce the probability of complete failure of an optical switch.

Figure 10A:
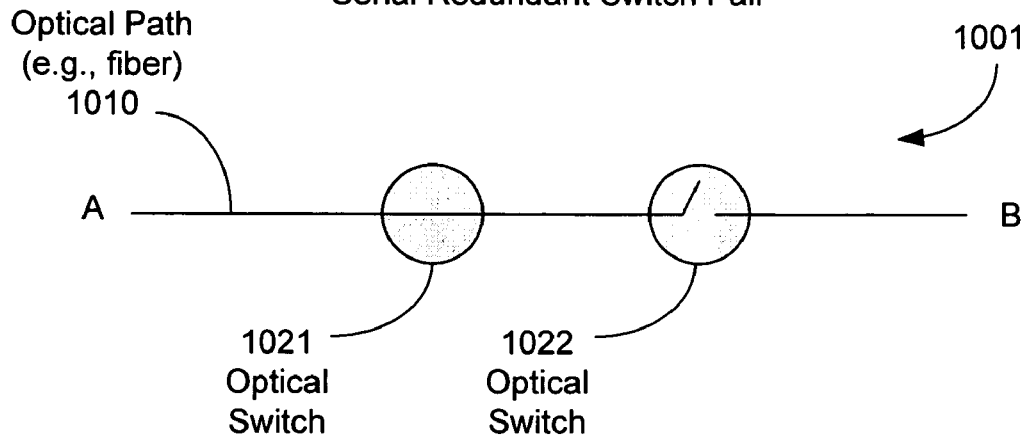
FIGS. 10A and 10B show two exemplary redundancy designs for optical switching devices.

FIG. 10A shows one example of a serial redundant switch pair as a switching device 1001 where two optical switches 1021 and 1022 are connected in series in an optical path 1010 such as a fiber line. This device 1001 can be used to provide redundancy in generating an optical break point or opening between two terminals A and B in the optical path 1010. If the optical switch 1021 fails to open, the second optical switch 1022 can be used to generate the desired optical break point in the optical path 1010. This device 1001 can be used to protect a "hard to open" condition in an optical path. Three or more optical switches can be used to further increase the redundancy of the device 1001.

Figure 10B:
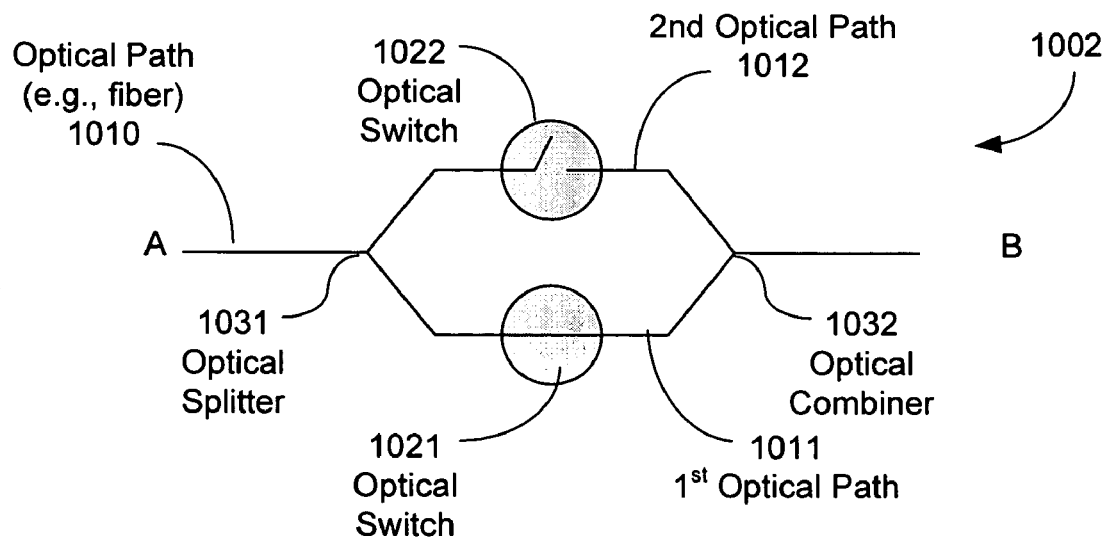

FIG. 10B shows one example of a parallel redundant switch pair as a switching device 1002 where two optical switches 1021 and 1022 are connected in two parallel optical paths 1011 and 1012, respectively, in an optical path 1010 such as a fiber line. An optical splitter 1031 is coupled in the optical path 1010 to connect to the first and second optical paths 1011 and 1012 and an optical combiner 1032 is coupled in the optical path 1010 to join the first and second optical paths 1011 and 1012 into the optical path 1010. This device 1002 provide two alternative paths between two terminals A and B in the optical path 1010 and to provide redundancy in connecting the two terminals A and B in the optical path 1010. If the optical switch 1021 in the first optical path 1011 fails to close, the second optical switch 1022 in the second optical path 1012 can be used to optically connect the two terminals A and B in the optical path 1010. This device 1002 can be used to protect a "hard to close" condition in an optical path and can include three or more parallel optical paths to further increase the redundancy of the device.

Figure 11A:
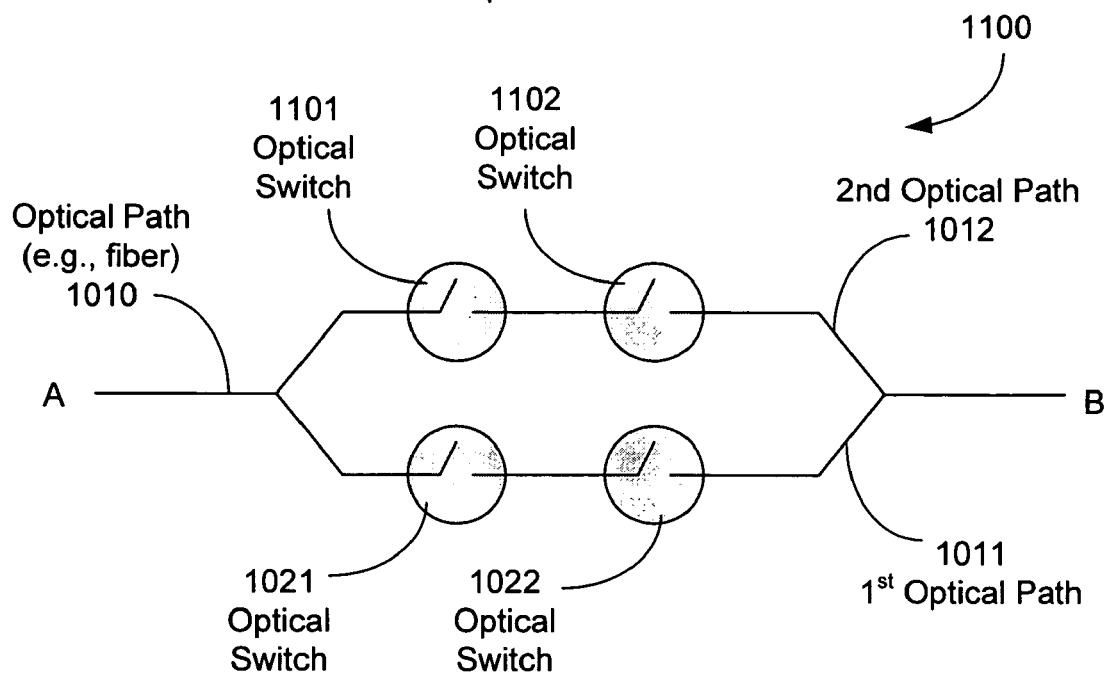
FIGS. 11A and 11B show two operation modes of an optical switching device based on the designs in FIGS. 10A and 10B.
Figure 11B:
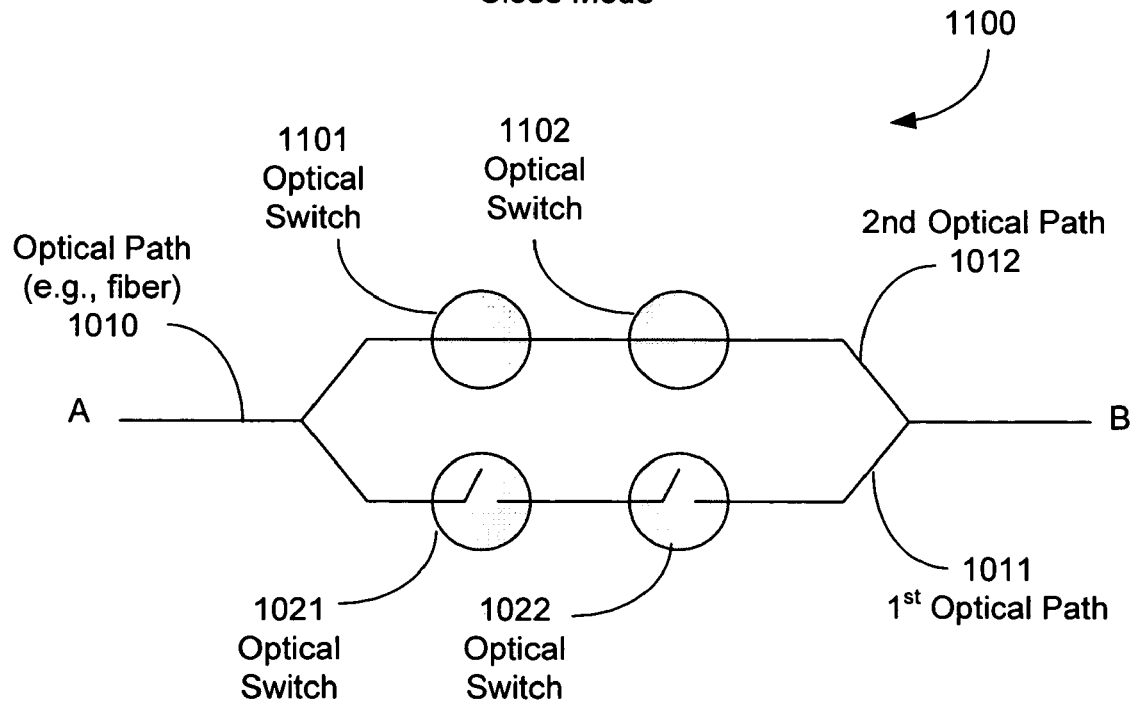

FIGS. 11A and 11B show two operation modes of a switching device 1100 that combines the serial redundancy in FIG. 10A and the parallel redundancy in FIG. 10B. The first optical path 1012 includes two optical switches 1101 and 1102 connected in series and the second optical path 1012 includes two optical switches 1021 and 1022 connected in series. This switching device 1100 can be used to protect both "hard to open" and "hard to close" conditions.

FIG. 11A shows an open mode of the switching device 1100 where all four optical switches 1101, 1102, 1021 and 1022 are open to optically separate the two terminals A and B in the optical path 1010. To create an optical break point between the terminals A and B, each optical path needs to have one optical switch open. Another open mode for the switching device 1100 can be switches 1101 and 1021 in their open positions while switches 1102 and 1022 in their closed positions. If either of the default open switches 1101 and 1021 fails to open, another switch in the same path with the failed switch can be opened right away.

FIG. 11B shows a close mode of the device 1100 where the two switches 1021 and 1022 in the first optical path 1011 are open to create an optical break point between the two terminals A and B and the two switches 1101 and 1102 in the second optical path 1012 are closed to connect the two terminals A and B. Here, the second optical path 1012 is the default closed path to connect the terminals A and B. When one of the switches 1101 and 1102 fails to close, the switches 1021 and 1022 in the first optical path 1011 are closed to form a closed path between terminals A and B.

The switching device 1100 can be used as an optical switch at any location where an optical switch is needed to provide reliable switching operations. The device 1100 has two 1×2 optical couplers 1031 and 1032 and thus has approximately 7 dB optical loss. Using such a device in every node in a switched ring architecture network to provide optical switching in each node would incur too much optical loss in the network. In the ring networks shown in FIGS. 2 and 5 where an optical switch is used in the central node while optical switching in other nodes is effectuated by using optical amplifiers, the device 1100 can be used in the central node to provide reliable optical switching in one of the fiber rings or both fiber rings.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations are disclosed. However, it is understood that variations and enhancements may be made.

What is claimed is:

1. A method for optical protection switching in a dual-fiber optical ring network in which a plurality of network nodes is interconnected by a first fiber optic cable for signals propagating in a clockwise direction and a second fiber optic cable for signals propagating in a counterclockwise direction, the method including the following steps:

(a) generating and terminating, at a first of the plurality of network nodes, a first and second circulating optical probe signal that propagate to each of the plurality of network nodes along the respective first and second fiber optic cables, wherein the first and second optical probe signals are retransmitted without undergoing an optical to electrical conversion at each of the plurality of network nodes, and are generated at optical wavelengths different from those of optical wavelength-division multiplexed (WDM) signals carrying data and control information that must be retransmitted by undergoing the optical to electrical conversion at each of the plurality of network nodes;

(b) monitoring the first and second optical probe signals to detect the presence of an optical failure in the optical ring network, wherein the detection of an optical break point in at least one of the optical probe signals indicates the presence of an optical failure in the optical ring network, and wherein the absence of an optical break point in both the first and second optical probe signals indicates normal operation of the optical ring network; and (c) controlling a protection switch mechanism, in response to the detection of an optical failure, to sustain communications in the optical ring network outside a location of the optical failure, and to restore communications in the optical ring network in response to the subsequent detection of normal operation of the optical ring network, indicating that the optical failure has been repaired.

2. The method of claim 1, wherein each of the plurality of network node performs the step of monitoring the first and second optical probe signals and communicates the results of such monitoring to the first of the plurality of network nodes, and wherein the first of the plurality of network nodes uses the results, in the event the first of the plurality of network nodes detects an optical failure, to identify the location of the optical failure and to create a protective break point at one or more network nodes adjacent to the location of the optical failure.

3. The method of claim 1, wherein the protection switch mechanism includes a first and second optical switch at the first of the plurality of network node that create a default protective break point on the respective first and second fiber optic cables, and wherein the protection switch mechanism sets the first and second switches to the closed position in response to the detection of an optical failure, and to the open position in response to the detection of normal operation of the optical ring network.

4. The method of claim 3, wherein each of the plurality of network nodes monitors the first and second fiber optic cables to detect an optical failure from an adjacent network node, and, in response to the detection of such an optical failure, creates a protective break point until the optical failure has been repaired.

5. A method for optical protection switching in a dual-fiber optical ring network in which a plurality of network nodes is interconnected by a first fiber optic cable for signals propagating in a clockwise direction and a second fiber optic cable for signals propagating in a counterclockwise direction, the method including the following steps:

(a) generating and terminating, at a first of the plurality of network nodes, a first and second circulating optical probe signal that propagate to each of the plurality of network nodes along the respective first and second fiber optic cables, wherein the first and second optical probe signals are retransmitted without undergoing an optical to electrical conversion at each of the plurality of network nodes, and are generated at optical wavelengths different from those of optical wavelength-division multiplexed (WDM) signals carrying data and control information that must be retransmitted by undergoing the optical to electrical conversion at each of the plurality of network nodes;

(b) creating, at the first of the plurality of network nodes, a default protective break point on the first and second fiber optic cables;

(c) monitoring the first and second optical probe signals to detect the presence of an optical failure in the optical ring network, wherein the detection of an optical break point in at least one of the optical probe signals indicates the presence of an optical failure in the optical ring network, and wherein the absence of an optical break point in both the first and second optical probe signals indicates normal operation of the optical ring network; and (d) controlling a protection switch mechanism, in response to the detection of an optical failure, to replace the default protective break point at the first of the plurality of network nodes with a protective break point at one or more network nodes adjacent to the location of the optical failure, and to replace the protective break point with the default protective break point in response to the subsequent detection of normal operation of the optical ring network, indicating that the optical failure has been repaired.

6. The method of claim 5, wherein each of the plurality of network nodes performs the step of monitoring the first and second optical probe signals and communicates the results of such monitoring to the first of the plurality of network nodes, and wherein the first of the plurality of network nodes uses the results, in the event the first of the plurality of network nodes detects an optical failure, to identify the location of the optical failure and to perform the step of controlling the protection switch mechanism.

7. The method of claim 5, wherein the default protective break point on the first and second fiber optic cables is created by opening a first and second optical switch at the first of the plurality of network nodes, and wherein the protection switch mechanism sets the first and second switches to the closed position in response to the detection of an optical failure, and to the open position in response to the detection of normal operation of the optical ring network.

8. The method of claim 7, wherein each of the plurality of network nodes monitors the first and second fiber optic cables to detect an optical failure from an adjacent network node, and, in response to the detection of such an optical failure, creates the protective break point, as part of the protection switch mechanism, until the optical failure has been repaired.

9. An optical protection switching controller in a dual-fiber optical ring network in which a plurality of network nodes is interconnected by a first fiber optic cable for signals propagating in a clockwise direction and a second fiber optic cable for signals propagating in a counterclockwise direction, the controller comprising:

(a) a first and second circulating optical probe signal, generated and terminated at a first of the plurality of network nodes, that propagate to each of the plurality of network nodes along the respective first and second fiber optic cables, wherein the first and second optical probe signals are retransmitted without undergoing an optical to electrical conversion at each of the plurality of network nodes, and are generated at optical wavelengths different from those of optical wavelength-division multiplexed (WDM) signals carrying data and control information that must be retransmitted by undergoing the optical to electrical conversion at each of the plurality of network nodes;

(b) an optical failure detector that monitors the first and second optical probe signals, wherein the detection of an optical break point in at least one of the optical probe signals indicates the presence of an optical failure in the optical ring network, and wherein the absence of an optical break point in both the first and second optical probe signals indicates normal operation of the optical ring network; and (c) a protection switch mechanism that, in response to the detection of an optical failure, sustains communications in the optical ring network outside a location of the optical failure, and restores communications in the optical ring network in response to the subsequent detection of normal operation of the optical ring network, indicating that the optical failure has been repaired.

10. The optical protection switching controller of claim 9, wherein each of the plurality of network nodes monitors the first and second optical probe signals and communicates the results of such monitoring to the first of the plurality of network nodes, and wherein the first of the plurality of network nodes uses the results, in the event the first of the plurality of network nodes detects an optical failure, to identify the location of the optical failure and to create a protective break point at one or more network nodes adjacent to the location of the optical failure.

11. The optical protection switching controller of claim 9, wherein the protection switch mechanism includes a first and second optical switch at the first of the plurality of network nodes that create a default protective break point on the respective first and second fiber optic cables, and wherein the protection switch mechanism sets the first and second switches to the closed position in response to the detection of an optical failure, and to the open position in response to the detection of normal operation of the optical ring network.

12. The optical protection switching controller of claim 11, wherein each of the plurality of network nodes monitors the first and second fiber optic cables to detect an optical failure from an adjacent network node, and, in response to the detection of such an optical failure, creates a protective break point until the optical failure has been repaired.

13. An optical protection switching controller in a dual-fiber optical ring network in which a plurality of network nodes is interconnected by a first fiber optic cable for signals propagating in a clockwise direction and a second fiber optic cable for signals propagating in a counterclockwise direction, the controller comprising:

(a) a first and second circulating optical probe signal, generated and terminated at a first of the plurality of network nodes, that propagate to each of the plurality of network nodes along the respective first and second fiber optic cables, wherein the first and second optical probe signals are retransmitted without undergoing an optical to electrical conversion at each of the plurality of network nodes, and are generated at optical wavelengths different from those of optical wavelength-division multiplexed (WDM) signals carrying data and control information that must be retransmitted by undergoing the optical to electrical conversion at each of the plurality of network nodes;

(b) a default protective break point created at the first of the plurality of network nodes on the first and second fiber optic cables;

(c) an optical failure detector that monitors the first and second optical probe signals, wherein the detection of an optical break point in at least one of the optical probe signals indicates the presence of an optical failure in the optical ring network, and wherein the absence of an optical break point in both the first and second optical probe signals indicates normal operation of the optical ring network; and (d) a protection switch mechanism that, in response to the detection of an optical failure, replaces the default protective break point at the first of the plurality of network nodes with a protective break point at one or more network nodes adjacent to the location of the optical failure, and replaces the protective break point with the default protective break point in response to the subsequent detection of normal operation of the optical ring network, indicating that the optical failure has been repaired.

14. The optical protection switching controller of claim 13, wherein each of the plurality of network nodes monitors the first and second optical probe signals and communicates the results of such monitoring to the first of the plurality of network nodes, and wherein the first of the plurality of network nodes uses the results, in the event the first of the plurality of network nodes detects an optical failure, to identify the location of the optical failure and to control the protection switch mechanism.

15. The optical protection switching controller of claim 13, wherein the default protective break point on the first and second fiber optic cables is created by opening a first and second optical switch at the first of the plurality of network nodes, and wherein the protection switch mechanism sets the first and second switches to the closed position in response to the detection of an optical failure, and to the open position in response to the detection of normal operation of the optical ring network.

16. The optical protection switching controller of claim 15, wherein each of the plurality of network nodes monitors the first and second fiber optic cables to detect an optical failure from an adjacent network node, and, in response to the detection of such an optical failure, creates the protective break point, as part of the protection switch mechanism, until the optical failure has been repaired.

* * * * *